US012684487B2

(12) United States Patent
Zhang et al.

(10) Patent No.: US 12,684,487 B2
(45) Date of Patent: Jul. 14, 2026

(54) ALWAYS ON DISPLAY METHOD, TERMINAL DEVICE, AND CHIP

(71) Applicant: Huawei Technologies Co., Ltd., Shenzhen (CN)

(72) Inventors: Ming Zhang, Wuhan (CN); Yan Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/360,995

(22) Filed: Jul. 28, 2023

(65) Prior Publication Data

US 2023/0370972 A1      Nov. 16, 2023

Related U.S. Application Data

(63) Continuation of application No. PCT/CN2021/136540, filed on Dec. 8, 2021.

(30) Foreign Application Priority Data

Jan. 29, 2021      (CN) .......................... 202110129169.7

(51) Int. Cl.
*H04W 52/02*      (2009.01)
*G06F 1/3234*      (2019.01)
(Continued)

(52) U.S. Cl.
CPC ...... *H04W 52/0267* (2013.01); *G06F 1/3265* (2013.01); *G06F 9/451* (2018.02); *H04M 1/72448* (2021.01); *G09G 2330/022* (2013.01)

(58) Field of Classification Search
CPC .. H04W 52/0267; G06F 1/3265; G06F 9/451; G06F 1/3246; G06F 1/3293; G06F 3/147;
(Continued)

(56) References Cited

U.S. PATENT DOCUMENTS

2015/0082255 A1      3/2015  Devries et al.
2018/0240260 A1      8/2018  Lee et al.
(Continued)

FOREIGN PATENT DOCUMENTS

CN      110278325 A      9/2019
CN      110312985 A      10/2019
(Continued)

OTHER PUBLICATIONS

English translation of EP 2 973 535 B1 (Year: 2017).*
English translation of EP 3 761 219 A1 (Year: 2021).*
English translation of JPH10334226A (Year: 1998).*

*Primary Examiner* — Matthew D. Anderson
(74) *Attorney, Agent, or Firm* — Conley Rose, P.C.

(57)      ABSTRACT
An always-on display method includes, in response to a screen-off event, a first processor sends always-on display control information to a second processor and then sleeps. The always-on display control information includes an always-on display instruction. In response to the always-on display instruction, the second processor switches a screen-on interface to a first screen-off interface, and in response to a screen-off interface switching event, the second processor switches the first screen-off interface to a second screen-off interface, and the display content of at least one of the first screen-off interface or the second screen-off interface includes a dynamic picture.

16 Claims, 17 Drawing Sheets

(51) Int. Cl.
    *G06F 9/451*       (2018.01)
    *H04M 1/72448*    (2021.01)

(58) Field of Classification Search
    CPC ........ H04M 1/72448; G09G 2330/022; G09G
                  2330/027; G09G 2354/00; G09G
                           2360/08; Y02D 30/70
    See application file for complete search history.

(56)                References Cited

U.S. PATENT DOCUMENTS

| | | | |
|---|---|---|---|
| 2019/0189048 A1* | 6/2019 | Hong | ..................... G09G 5/393 |
| 2019/0286222 A1 | 9/2019 | An et al. | |
| 2020/0294473 A1 | 9/2020 | Tung | |

FOREIGN PATENT DOCUMENTS

| | | | |
|---|---|---|---|
| EP | 2973535 B1 | | 4/2017 |
| EP | 3761219 A1 | | 1/2021 |
| JP | H10334226 A | * | 12/1998 |

* cited by examiner

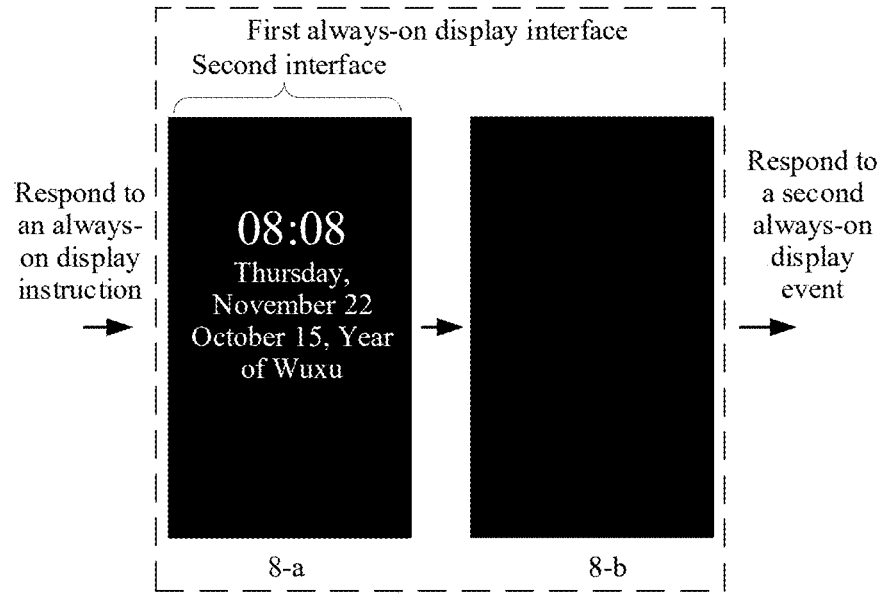
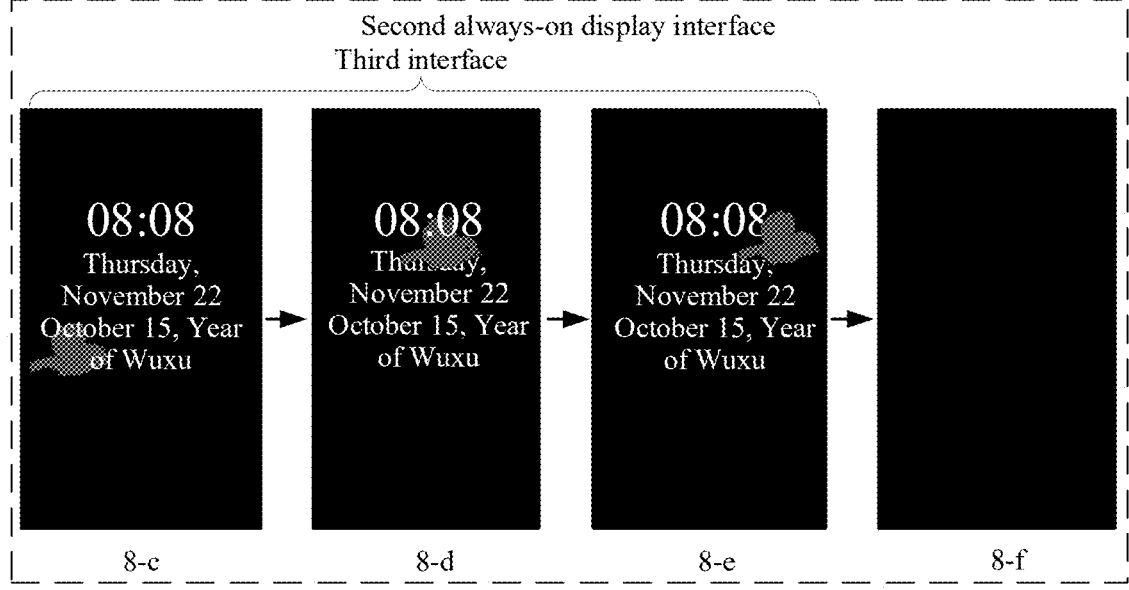
FIG. 8

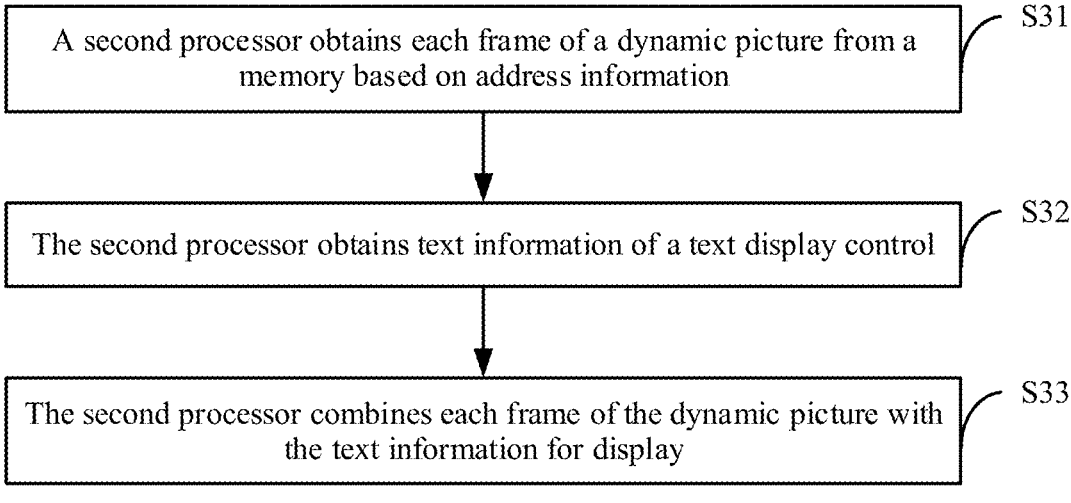

A second processor obtains each frame of a dynamic picture from a memory based on address information — S31

The second processor obtains text information of a text display control — S32

The second processor combines each frame of the dynamic picture with the text information for display — S33

FIG. 12

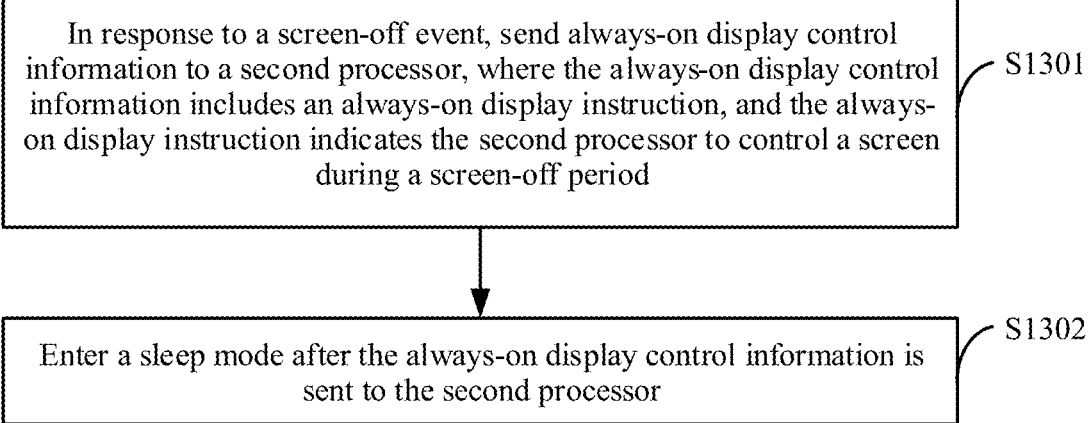

In response to a screen-off event, send always-on display control information to a second processor, where the always-on display control information includes an always-on display instruction, and the always-on display instruction indicates the second processor to control a screen during a screen-off period — S1301

Enter a sleep mode after the always-on display control information is sent to the second processor — S1302

FIG. 13

Terminal device 1600

Chip 1700

ALWAYS ON DISPLAY METHOD, TERMINAL DEVICE, AND CHIP

CROSS-REFERENCE TO RELATED APPLICATIONS

This is a continuation of International Patent Application No. PCT/CN2021/136540 filed on Dec. 8, 2021, which claims priority to Chinese Patent Application No. 202110129169.7 filed on Jan. 29, 2021. The disclosures of the aforementioned applications are hereby incorporated by reference in their entireties.

TECHNICAL FIELD

This disclosure relates to the field of display technologies, and in particular, to an always-on display method, a terminal device, and a chip.

BACKGROUND

In a screen-off scenario, namely, a standby scenario, a screen of a terminal device may still display information such as a time point, a date, a personalized U pattern, and a notification, which is referred to as always-on display (AOD). In a conventional AOD function, when a mobile phone is in a screen-off state, always-on display content needs to be sent to a screen before an application processor sleeps. A dynamic effect needs to be played by waking up the application processor. In addition, a time point, a date, and other information on the screen need to be refreshed periodically (per minute). As a result, the application processor needs to be woken up every minute to perform refreshing. Consequently, the application processor is in a non-sleep state for most of time, which is unfavorable to reducing power consumption of the application processor during a screen-off period.

SUMMARY

Embodiments of this disclosure provide an always-on display method, a terminal device, and a chip. During an always-on display period, a first processor, such as a main processor (or an application processor), does not need to be periodically woken up, and a second processor, such as a coprocessor, can control a screen to play a dynamic picture, so that a user experience effect is improved, a user requirement can be better met, and power consumption of the first processor can be significantly reduced.

According to a first aspect, an embodiment of this disclosure provides an always-on display method, applied to a terminal device, where the terminal device includes a display screen, a first processor, and a second processor. The always-on display method includes that in response to a screen-off event, the first processor sends always-on display control information to the second processor, where the always-on display control information includes an always-on display instruction, and the first processor enters a sleep mode after sending the always-on display control information to the second processor, and in response to the always-on display instruction, the second processor controls a screen-off interface of the display screen, where at least one interface in the screen-off interface of the display screen includes a dynamic picture.

During an always-on display period, the first processor does not need to be woken up periodically, and the second processor can control the display screen to play the dynamic picture, so that power consumption of the first processor can be significantly reduced, a user experience effect can be improved, and a user requirement can be better met.

In a possible implementation, that the second processor controls a screen-off interface of the display screen includes that the second processor switches a screen-on interface to a first screen-off interface, and in response to a screen-off interface switching event, the second processor switches the first screen-off interface to a second screen-off interface, where display content of at least one of the first screen-off interface and the second screen-off interface includes the dynamic picture.

In a possible implementation, the first screen-off interface is determined by the second processor according to a first always-on display rule, and the second screen-off interface is determined by the second processor according to a second always-on display rule.

In a possible implementation, the first always-on display rule and the second always-on display rule are carried in the always-on display control information, or the first always-on display rule and the second always-on display rule are preset in the second processor.

In a possible implementation, the first processor is a main processor, and the second processor is a coprocessor.

In a possible implementation, the first screen-off interface is a black screen interface, and the first always-on display rule includes controlling the display screen to keep black continuously. The second screen-off interface includes a first interface and a black screen interface, display content of the first interface includes the dynamic picture, and the second always-on display rule includes switching to the black screen interface after the first interface is displayed for predetermined duration. Alternatively, the first screen-off interface and the second screen-off interface each include a first interface and a black screen interface, display content of the first interface includes the dynamic picture, and both the first always-on display rule and the second always-on display rule include switching to the black screen interface after the first interface is displayed for predetermined duration.

In response to the always-on display instruction, the second processor controls the screen to go black. After receiving the screen-off interface switching event, the second processor controls the screen to play the dynamic picture within predetermined duration, and controls the screen to go black after predetermined duration expires (beyond predetermined duration). Alternatively, in response to the always-on display instruction, the second processor controls the screen to play the dynamic picture within predetermined duration, and controls the screen to go black after predetermined duration expires. After receiving the screen-off interface switching event, the second processor controls the screen to play the dynamic picture within predetermined duration, and controls the screen to go black when predetermined duration expires.

In a possible implementation, the display content of the at least one of the first screen-off interface and the second screen-off interface further includes text information that is of a text display control and that changes with time.

In a possible implementation, the first screen-off interface includes the text information, and the first always-on display rule includes continuously displaying the text information. The second screen-off interface includes a second interface and a third interface, display content of the second interface includes the text information and the dynamic picture, display content of the third interface includes the text information, and the second always-on display rule includes switching to display the third interface after the second interface is displayed for predetermined duration. Alternatively, the first screen-off interface includes a second interface and a black screen interface, the second interface includes the text information, and the second always-on display rule includes switching to the black screen interface after the second interface is displayed for predetermined duration. The second screen-off interface includes a third interface and a black screen interface, display content of the third interface includes the text information and the dynamic picture or includes only the dynamic picture, and the second always-on display rule includes switching to the black screen interface after the third interface is displayed for predetermined duration.

In response to the always-on display instruction, the second processor controls the screen to continuously display the text information. After receiving the screen-off interface switching event, the second processor controls the screen to display the text information and play the dynamic picture within predetermined duration, and controls the screen to display only the text information after predetermined duration expires. Alternatively, in response to the always-on display instruction, the second processor controls the screen to go black after displaying the text information for predetermined duration. After receiving the screen-off interface switching event, the second processor controls the screen to display the text information and play the dynamic picture or play only the dynamic picture within predetermined duration, and controls the screen to go black when predetermined duration expires.

In a possible implementation, the first screen-off interface includes a fourth interface and a fifth interface, the fourth interface includes the text information and the dynamic picture, display content of the fifth interface includes the text information, and the first always-on display rule includes switching to display the fifth interface after the fourth interface is displayed for predetermined duration. The second screen-off interface includes a sixth interface and a seventh interface, the sixth interface includes the text information and the dynamic picture, display content of the seventh interface includes the text information, and the second always-on display rule includes switching to display the seventh interface after the sixth interface is displayed for predetermined duration. Alternatively, the first screen-off interface includes a fourth interface and a black screen interface, the fourth interface includes the text information and the dynamic picture, and the first always-on display rule includes switching to the black screen interface after the fourth interface is displayed for predetermined duration. The second screen-off interface includes a fifth interface and a black screen interface, display content of the fifth interface includes the text information and/or the dynamic picture, and the second always-on display rule includes switching to the black screen interface after the fifth interface is displayed for predetermined duration.

In response to the always-on display instruction, the second processor controls the screen to display the text information and play the dynamic picture within predetermined duration, and controls the screen to display only the text information after predetermined duration expires. After receiving the screen-off interface switching event, the second processor controls the screen to display the text information and play the dynamic picture within predetermined duration, and controls the screen to display only the text information after predetermined duration expires. Alternatively, in response to the always-on display instruction, the second processor controls the screen to display the text information and play the dynamic picture within predetermined duration, and controls the screen to go black after predetermined duration expires. After receiving the screen-off interface switching event, the second processor controls the screen to display the text information and/or play the dynamic picture within predetermined duration, and controls the screen to go black when predetermined duration expires.

In a possible implementation, the first screen-off interface includes an eighth interface and a black screen interface, display content of the eighth interface includes the dynamic picture, and the first always-on display rule includes switching to the black screen interface after the eighth interface is displayed for predetermined duration. The second screen-off interface includes a ninth interface and a tenth interface, display content of the ninth interface includes the text information or includes the text information and the dynamic picture, display content of the tenth interface includes either a black screen interface or the text information, and the second always-on display rule includes switching to the tenth interface after the ninth screen is displayed for predetermined duration.

In response to the always-on display instruction, the second processor controls the screen to play the dynamic picture within predetermined duration, and controls the screen to go black after predetermined duration expires. After receiving the screen-off interface switching event, the second processor controls the screen to display the text information or display the text information and play the dynamic picture within predetermined duration, and controls the screen to display only the text information or go black after predetermined duration expires.

In a possible implementation, a type of the text display control includes at least one of a time point control, a date control, a battery level control, and a Chinese calendar control. Text information of each type of text display control occupies one or more than two layers, and/or one or more than two types of text display controls are displayed on each layer. For example, the text display control includes a time point control and a date control. When a time point displayed on the time point control is "08:08" and a date displayed on the date control is "November 22", "08:08" may occupy a first layer, and "November 22" may occupy a second layer. Alternatively, "08:" in "08:08" may occupy the first layer, and "08" in "08:08" may occupy the second layer. In addition, only the time point "08:08" may be displayed on the first layer, or the time point "08:08" and the date "November 22" may be displayed on the first layer at the same time.

In a possible implementation, the always-on display control information further includes address information. The address information indicates a location of a memory for storing each frame of the dynamic picture. That the second processor switches a screen-on interface to a first screen-off interface or that the second processor switching the first screen-off interface to a second screen-off interface includes that the second processor obtains each frame of the dynamic picture from the memory based on the address information, the second processor obtains the text information of the text display control, and the second processor combines each frame of the dynamic picture with the text information for display.

In when receiving the screen-off event, the first processor may decompose a screen-off style previously selected by a user, where the screen-off style may include the dynamic picture and the text display control. Further, the first processor may apply for a memory, to store each frame of the dynamic picture that occupies large space into the memory, and send address information that indicates a location of the memory to the second processor. In this way, during the always-on display period, the second processor may obtain each frame of the dynamic picture based on the address information, and then combine each frame of the dynamic picture with text information of a text display control for display, to form a first screen-off interface or a second screen-off interface. This helps reduce a requirement on performance of the second processor, and further reduces power consumption of the second processor when the second processor works. In addition, after the always-on display ends, that is, the first processor is woken up and starts to work, the first processor may release the previously applied memory.

In a possible implementation, that the second processor obtains the text information of the text display control includes that the second processor directly obtains the text information of the text display control of a preset type, where a type of the text display control displayed on the display screen is preset by the second processor. Alternatively, the second processor obtains the text information of the text display control of a corresponding type based on identification information, where the always-on display control information includes the identification information and the identification information identifies a type of the text display control.

The type of the text display control displayed on the screen during the always-on display period may be preset in the second processor, or the identification information that identifies the type of the text display control may be carried in the always-on display control information sent by the first processor, so that the second processor controls, based on the identification information, the screen to display the text information of the corresponding text display control.

In a possible implementation, the always-on display control information further includes a stacking order. The stacking order indicates an arrangement order of each frame of the dynamic picture and the text information. The stacking order includes locating at least one frame of the dynamic picture below the text information at a first moment and/or locating at least one frame of the dynamic picture above the text information at a second moment.

Because at least one frame of the dynamic picture is located below the text information at the first moment, and at least one frame of the dynamic picture is located above the text information at the second moment, a three-dimensional (3D) effect in which the dynamic picture traverses from the bottom of the text information to the top of the text information can be formed from the first moment to the second moment, and a user experience effect can be improved.

In a possible implementation, each frame of the dynamic picture includes M layers, where M is greater than or equal to 2. The stacking order further includes that the text information is located between adjacent layers of the M layers at a third moment.

Each frame of the dynamic picture may include at least two layers, each layer includes a part of the pattern, and the M layers may be stacked layer by layer to form the complete pattern. The text information is located between adjacent layers of the M layers at the third moment, so that a 3D effect of the dynamic picture at the third moment may be more prominent.

In a possible implementation, the screen-off event includes that no user operation is received within predetermined duration, or a power button is pressed when the screen-on interface is displayed, and/or the screen-off interface switching event is one of a screen touching event, a terminal device moving event, and a screen gazing event.

If no user operation is received within predetermined duration or the power button is pressed when the screen-on interface is displayed, the first processor sends the always-on display control information to the second processor, and then the first processor enters the sleep mode. The second processor controls, according to the first always-on display rule, the display screen to display the first screen-off interface. When one of the screen touching event, the terminal device moving event, and the screen gazing event occurs, the second processor switches the first screen-off interface to the second screen-off interface.

In a possible implementation, the always-on display method includes that in response to a screen-on event, the first processor controls the display screen to display the screen-on interface, where the screen-on interface is an interface obtained after the display screen exits always-on display and the entire screen is woken up, and the screen-on event includes tapping the power button or a fingerprint button when the screen-off interface is displayed.

When the always-on display is performed, the power button on a side of the terminal device such as a mobile phone or the fingerprint button on the front of a screen of the mobile phone may be tapped to switch the screen-off interface to the screen-on interface.

According to a second aspect, an embodiment of this disclosure provides an always-on display method, performed by a first processor, where the first processor and a second processor are located in a same terminal device. The always-on display method includes that in response to a screen-off event, sending always-on display control information to the second processor, where the always-on display control information includes an always-on display instruction, and the always-on display instruction indicates the second processor to control a screen-off interface of a display screen of the terminal device during a screen-off period, and entering a sleep mode after sending the always-on display control information to the second processor.

According to a third aspect, an embodiment of this disclosure provides an always-on display method, performed by a second processor, where the second processor and a first processor are located in a same terminal device. The always-on display method includes receiving always-on display control information sent by the first processor, where the always-on display control information includes an always-on display instruction, and in response to the always-on display instruction, controlling a screen-off interface of a display screen, where at least one interface in the screen-off interface of the display screen includes a dynamic picture.

In a possible implementation, controlling a screen-off interface of a display screen includes switching a screen-on interface to a first screen-off interface, and in response to a screen-off interface switching event, switching the first screen-off interface to a second screen-off interface. Display content of at least one of the first screen-off interface and the second screen-off interface includes the dynamic picture.

According to a fourth aspect, an embodiment of this disclosure provides a terminal device, where the terminal device includes a display screen, a first processor, and a second processor. The first processor is configured to, in response to a screen-off event, send always-on display control information to the second processor, where the always-on display control information includes an always-on display instruction, and the first processor enters a sleep mode after sending the always-on display control information to the second processor. The second processor is configured to, in response to the always-on display instruction, control a screen-off interface of the display screen, where at least one interface in the screen-off interface of the display screen includes a dynamic picture.

In a possible implementation, the second processor is configured to switch a screen-on interface to a first screen-off interface, and in response to a screen-off interface switching event, switch the first screen-off interface to a second screen-off interface. Display content of at least one of the first screen-off interface and the second screen-off interface includes the dynamic picture.

In a possible implementation, the first screen-off interface is determined by the second processor according to a first always-on display rule, and the second screen-off interface is determined by the second processor according to a second always-on display rule.

In a possible implementation, the first always-on display rule and the second always-on display rule are carried in the always-on display control information, or the first always-on display rule and the second always-on display rule are preset in the second processor.

In a possible implementation, the first processor is a main processor, and the second processor is a coprocessor.

In a possible implementation, the first screen-off interface is a black screen interface, and the first always-on display rule includes controlling the display screen to keep black continuously. The second screen-off interface includes a first interface and a black screen interface, display content of the first interface includes the dynamic picture, and the second always-on display rule includes switching to the black screen interface after the first interface is displayed for predetermined duration. Alternatively, the first screen-off interface and the second screen-off interface each include a first interface and a black screen interface, display content of the first interface includes the dynamic picture, and both the first always-on display rule and the second always-on display rule include switching to the black screen interface after the first interface is displayed for predetermined duration.

In a possible implementation, the display content of the at least one of the first screen-off interface and the second screen-off interface further includes text information that is of a text display control and that changes with time.

In a possible implementation, the first screen-off interface includes the text information, and the first always-on display rule includes continuously displaying the text information. The second screen-off interface includes a second interface and a third interface, display content of the second interface includes the text information and the dynamic picture, display content of the third interface includes the text information, and the second always-on display rule includes switching to display the third interface after the second interface is displayed for predetermined duration. Alternatively, the first screen-off interface includes a second interface and a black screen interface, the second interface includes the text information, and the second always-on display rule includes switching to the black screen interface after the second interface is displayed for predetermined duration. The second screen-off interface includes a third interface and a black screen interface, display content of the third interface includes the text information and the dynamic picture or includes only the dynamic picture, and the second always-on display rule includes switching to the black screen interface after the third interface is displayed for predetermined duration.

In a possible implementation, the first screen-off interface includes a fourth interface and a fifth interface, the fourth interface includes the text information and the dynamic picture, display content of the fifth interface includes the text information, and the first always-on display rule includes switching to display the fifth interface after the fourth interface is displayed for predetermined duration. The second screen-off interface includes a sixth interface and a seventh interface, the sixth interface includes the text information and the dynamic picture, display content of the seventh interface includes the text information, and the second always-on display rule includes switching to display the seventh interface after the sixth interface is displayed for predetermined duration. Alternatively, the first screen-off interface includes a fourth interface and a black screen interface, the fourth interface includes the text information and the dynamic picture, and the first always-on display rule includes switching to the black screen interface after the fourth interface is displayed for predetermined duration. The second screen-off interface includes a fifth interface and a black screen interface, display content of the fifth interface includes the text information and/or the dynamic picture, and the second always-on display rule includes switching to the black screen interface after the fifth interface is displayed for predetermined duration.

In a possible implementation, the first screen-off interface includes an eighth interface and a black screen interface, display content of the eighth interface includes the dynamic picture, and the first always-on display rule includes switching to the black screen interface after the eighth interface is displayed for predetermined duration. The second screen-off interface includes a ninth interface and a tenth interface, display content of the ninth interface includes the text information or includes the text information and the dynamic picture, display content of the tenth interface includes either a black screen interface or the text information, and the second always-on display rule includes switching to display the tenth interface after the ninth screen is displayed for predetermined duration.

In a possible implementation, a type of the text display control includes at least one of a time point control, a date control, a battery level control, and a Chinese calendar control. Text information of each type of text display control occupies one or more than two layers, and/or one or more than two types of text display controls are displayed on each layer.

In a possible implementation, the always-on display control information further includes address information. The address information indicates a location of a memory for storing each frame of the dynamic picture. The second processor is further configured to obtain each frame of the dynamic picture from the memory based on the address information, obtain the text information of the text display control, and combine each frame of the dynamic picture with the text information for display.

In a possible implementation, the second processor is further configured to directly obtain the text information of the text display control of a preset type, where a type of the text display control displayed on the display screen is preset by the second processor. Alternatively, the always-on display control information includes identification information and the identification information identifies a type of the text display control. The second processor is further configured to obtain the text information of the text display control of a corresponding type based on the identification information.

In a possible implementation, the always-on display control information further includes a stacking order. The stacking order indicates an arrangement order of each frame of the dynamic picture and the text information. The stacking order includes locating at least one frame of the dynamic picture below the text information at a first moment and/or locating at least one frame of the dynamic picture above the text information at a second moment.

In a possible implementation, each frame of the dynamic picture includes M layers, where M is greater than or equal to 2. The stacking order further includes that the text information is located between adjacent layers of the M layers at a third moment.

In a possible implementation, the screen-off event includes that no user operation is received within predetermined duration, or a power button is pressed when the screen-on interface is displayed, and/or the screen-off interface switching event is one of a screen touching event, a terminal device moving event, and a screen gazing event.

In a possible implementation, the first processor is further configured to, in response to a screen-on event, control the display screen to display the screen-on interface, where the screen-on interface is an interface obtained after the display screen exits always-on display and the entire screen is woken up, and the screen-on event includes tapping the power button or a fingerprint button when the screen-off interface is displayed.

According to a fifth aspect, an embodiment of this disclosure provides a chip, including a processor and an interface circuit. The processor is connected to the interface circuit. The processor is configured to execute instructions, so that the chip is enabled to perform the method according to the second aspect or the third aspect. The interface circuit is used by the processor to communicate with another processor.

According to a sixth aspect, an embodiment of this disclosure provides a computer storage medium. The computer storage medium stores instructions, and when the instructions are run on a computer, the computer is enabled to perform the foregoing always-on display method.

According to a seventh aspect, an embodiment of this disclosure provides a computer program product including instructions. When the instructions are run on a computer, the computer is enabled to perform the foregoing always-on display method.

According to the always-on display method, the terminal device, and the chip that are provided in embodiments of this disclosure, during the always-on display period, the first processor does not need to be periodically woken up, and the second processor can control the display screen to play the dynamic picture, so that power consumption of the first processor can be significantly reduced, a user requirement can be better met, and a user experience effect can be improved.

BRIEF DESCRIPTION OF DRAWINGS

FIG. 8 is a schematic diagram of a fourth application scenario of an always-on display method according to an embodiment of this disclosure;

FIG. 12 is a specific flowchart of step S403 of the always-on display method in FIG. 4;

FIG. 13 is a flowchart of another always-on display method according to an embodiment of this disclosure;

DESCRIPTION OF EMBODIMENTS

To make objectives, technical solutions, and advantages of embodiments of this disclosure clearer, the following describes the technical solutions in embodiments of this disclosure with reference to the accompanying drawings.

In the description of embodiments of this disclosure, the term "example", "for example", "in an example", or the like is used to represent giving an example, an illustration, or a description. Any embodiment or design scheme described as "example". "for example", "in an example", or the like in embodiments of this disclosure should not be construed as being more preferred or having more advantages than another embodiment or design scheme. Exactly, use of the term such as "example", "for example", or "in an example" is intended to present a related concept in a specific manner.

The term "and/or" in the description of embodiments of this disclosure describes only an association relationship for describing associated objects and represents that three relationships may exist. For example, A and/or B may represent the following three cases: only A exists, both A and B exist, and only B exists. In addition, unless otherwise specified, the term "a plurality" means two or more. Moreover, the terms "first" and "second" are merely intended for a purpose of description, and shall not be understood as an indication or implication of relative importance or implicit indication of an indicated technical feature. Therefore, a feature limited by "first" or "second" may explicitly or implicitly include one or more features. The terms "include", "comprise", "have", and their variants all mean "include but are not limited to", unless otherwise further emphasized.

Figure 1:
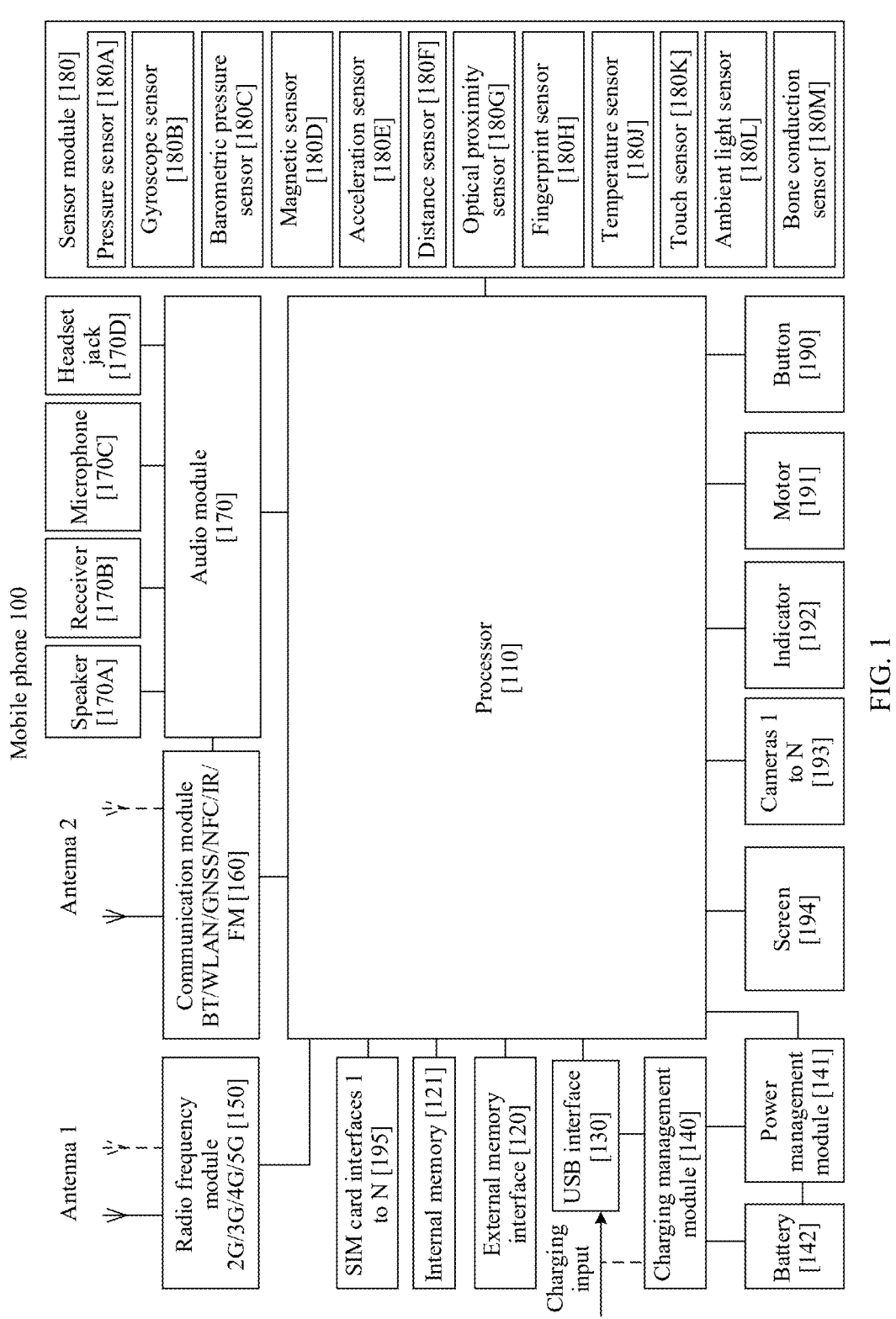
FIG. 1 is a schematic diagram of a hardware structure of a mobile phone.

FIG. 1 is a schematic diagram of a hardware structure of a mobile phone. As shown in FIG. 1, the mobile phone 100 may include a processor 110, an external memory interface 120, an internal memory 121, a Universal Serial Bus (USB) interface 130, a charging management module 140, a power management module 141, a battery 142, an antenna 1, an antenna 2, a radio frequency module 150, a communication module 160, an audio module 170, a speaker 170A, a receiver 170B, a microphone 170C, a headset jack 170D, a sensor module 180, a button 190, a motor 191, an indicator 192, a camera 193, a screen 194, a subscriber identification module (SIM) card interface 195, and the like.

It may be understood that the structure shown in this embodiment of this disclosure does not constitute a specific limitation on the mobile phone 100. In other embodiments of this disclosure, the mobile phone 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (AP), a modem processor 110, a graphics processing unit (GPU) 110, an image signal processor (ISP) 110, a controller, a memory, a video codec, a digital signal processor (DSP) 110, a baseband processor 110, a neural-network processing unit (NPU) 110, and/or the like. Different processing units may be independent components, or may be integrated into one or more processors 110.

The controller may be a nerve center and a command center of the mobile phone 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

In some embodiments, the processor 110 may include one or more interfaces. The interfaces may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI) 110, a general-purpose input/output (GPIO) interface, a SIM interface, a USB interface, and/or the like.

The I2C interface is a two-way synchronization serial bus, and includes one serial data line (SDL) and one serial clock line (SCL).

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. The PCM interface may also be configured to perform audio communication, and sample, quantize, and code an analog signal.

The UART interface is a universal serial data bus, and is configured to perform asynchronous communication. The bus may be a two-way communication bus. The bus converts to-be-transmitted data between serial communication and parallel communication.

The MIPI interface may be configured to connect the processor 110 and a peripheral component such as the screen 194 or the camera 193. The MIPI interface includes a camera 193 serial interface (CSI), a display serial interface (DSI), and the like. The GPIO interface may be configured by software. The GPIO interface may be configured as a control signal or a data signal. In some embodiments, the GPIO interface may be configured to connect the processor 110 to the camera 193, the screen 194, the communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB Type-C interface, or the like.

It may be understood that an interface connection relationship between the modules shown in this embodiment of this disclosure is merely an example for description, and does not constitute a limitation on the structure of the mobile phone 100. In some other embodiments of this disclosure, the mobile phone 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the screen 194, the camera 193, the communication module 160, and the like. The power management module 141 may be further configured to monitor parameters such as a battery capacity, a battery cycle count, and a battery health status (electric leakage or impedance). A wireless communication function of the mobile phone 100 may be implemented by using the antenna 1, the antenna 2, the radio frequency module 150, the communication module 160, the modem processor 110, the baseband processor 110, and the like.

The antenna 1 and the antenna 2 are configured to transmit and receive electromagnetic wave signals. Each antenna in the mobile phone 100 may be configured to cover one or more communication frequency bands. Different antennas may be further multiplexed, to improve antenna utilization. For example, the antenna 1 may be multiplexed as a diversity antenna of a wireless local area network. The radio frequency module 150 may provide a wireless communication solution that is applied to the mobile phone 100 and that includes second generation (2G)/third generation (3G)/fourth generation (4G)/fifth generation (5G). The radio frequency module 150 may include at least one filter, a switch, a power amplifier, a low-noise amplifier (LNA), and the like. The radio frequency module 150 may receive an electromagnetic wave through the antenna 1, perform processing such as filtering or amplification on the received electromagnetic wave, and transfer the electromagnetic wave to the modem processor 110 for demodulation. The radio frequency module 150 may further amplify a signal modulated by the modem processor 110, and convert the signal into an electromagnetic wave for radiation through the antenna 1.

The modem processor 110 may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor 110 for processing. The low-frequency baseband signal is processed by the baseband processor 110 and then transmitted to the application processor. The application processor outputs a sound signal through an audio device (which is not limited to the speaker 170A, the receiver 170B, or the like), or displays an image or a video through the screen 194. The communication module 160 may provide a wireless communication solution that is applied to the mobile phone 100 and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like. The communication module 160 may be one or more components integrating at least one communication processor module. The communication module 160 receives an electromagnetic wave through the antenna 2, performs frequency modulation and filtering processing on an electromagnetic wave signal, and sends a processed signal to the processor 110. The communication module 160 may further receive a to-be-sent signal from the processor 110, perform frequency modulation and amplification on the signal, and convert the signal into an electromagnetic wave for radiation through the antenna 2.

In some embodiments, the antenna 1 and the radio frequency module 150 of the mobile phone 100 are coupled, and the antenna 2 and the communication module 160 of the mobile phone 100 are coupled, so that the mobile phone 100 can communicate with a network and another device by using a wireless communication technology. The wireless communication technology may include a Global System for Mobile Communication (GSM), a General Packet Radio Service (GPRS), code-division multiple access (CDMA), wideband CDMA (WCDMA), time-division CDMA (TD-SCDMA), Long-Term Evolution (LTE), 5G, BT, the GNSS, the WLAN, the NFC, the FM, the IR technology, and/or the like. The GNSS may include a Global Positioning System (GPS), a global navigation satellite system (GLONASS), a BEIDOU navigation satellite system (BDS), a quasi-zenith satellite system (QZSS), and a satellite based augmentation system (SBAS).

The mobile phone 100 may implement a photographing function by using the ISP, the camera 193, the video codec, the GPU, the screen 194, the application processor, and the like.

The ISP is configured to process data fed back by the camera 193. For example, during photographing, a shutter is pressed, and light is transmitted to a photosensitive element of the camera 193 through a lens. An optical signal is converted into an electrical signal, and the photosensitive element of the camera 193 transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario.

The camera 193 may be configured to capture a static image or a video. An optical image of an object is generated through a lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the mobile phone 100 may include one or N cameras 193, where N is a positive integer greater than 1.

The digital signal processor 110 is configured to process a digital signal. In addition to a digital image signal, the digital signal processor may further process another digital signal. For example, when the mobile phone 100 selects a frequency, the digital signal processor 110 is configured to perform Fourier transform on frequency energy, and the like.

The video codec is configured to compress or decompress a digital video. The mobile phone 100 may support one or more video codecs. In this way, the mobile phone 100 can play or record videos in a plurality of encoding formats, for example, Moving Picture Experts Group (MPEG)-1, MPEG-2, MPEG-3, and MPEG-4.

Figure 2:
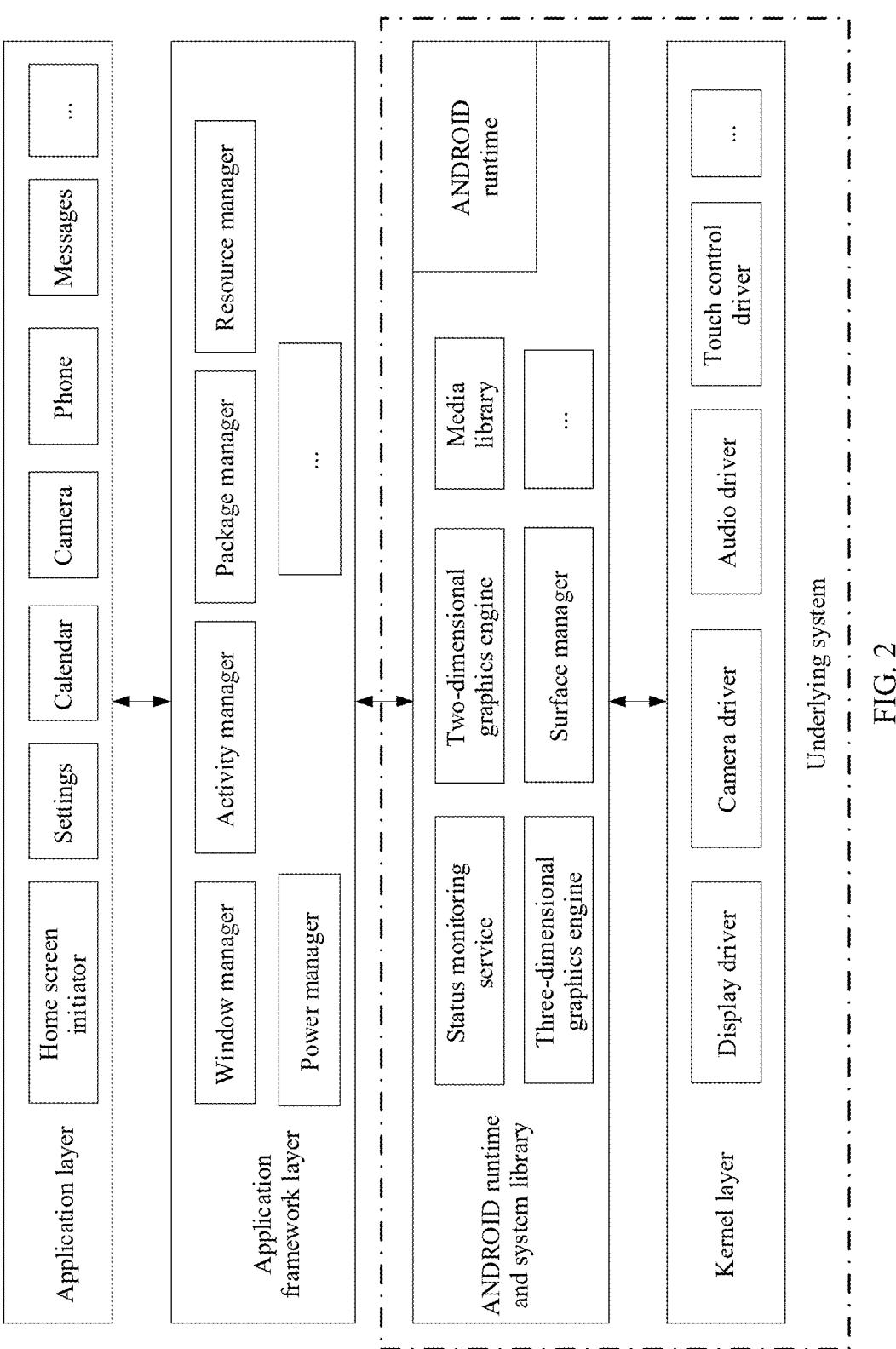
FIG. 2 is a schematic diagram of a structure of a software system used by the mobile phone in FIG. 1.

FIG. 2 is a schematic diagram of a structure of a software system used by the mobile phone in FIG. 1. As shown in FIG. 2, usually, the ANDROID system may be divided into four layers: an application layer, an application framework layer, a system library and ANDROID runtime, and a kernel layer from top to bottom. Each layer has a clear role and task. The layers communicate with each other through a software interface.

The application layer includes a series of applications deployed on the mobile phone 100. For example, the application layer includes but is not limited to Launcher, Settings, Calendar, Camera, Phone, and Messages.

The application framework layer may provide an application programming interface (API) and a programming framework for an application in the application layer, and may further include some predefined function modules/services. For example, the application framework layer includes but is not limited to a window manager, an activity manager, a package manager, a resource manager, and a power manager. The activity manager is configured to manage a life cycle of an application, and implement a navigation fallback function of each application. For example, the activity manager may be responsible for creating an activity process and maintaining a life cycle of an already created activity process. The window manager is configured to manage a window program. It may be understood that a graphical user interface of an application usually includes one or more activities, and the activity includes one or more views. The window manager may add, to the display screen 130, a view included in the graphical user interface that needs to be displayed, or is configured to remove the view from the graphical user interface displayed on the display screen 130. The package manager may manage a data packet corresponding to each application, for example, is configured to decompress, verify, install, and upgrade each data packet. In this embodiment of this disclosure, a new function module may be embedded into the package manager, and/or a function module independent of the package manager may be embedded into the application framework layer, so that the mobile phone 100 implements the method performed by the terminal device in any embodiment of this disclosure. The resource manager is configured to provide applications with access to various non-code resources. The power manager is a core service of power management of the ANDROID system, and is mainly configured to execute a computing task related to the power management of the ANDROID system. A decision is made downward to control a bottom-layer system of the ANDROID system to turn on or turn off the display, and start or stop a hardware device such as the range sensor and the optical proximity sensor. A corresponding operation interface is provided upward, so that each application at the application layer can invoke the operation interface to achieve a specific service objective.

The ANDROID runtime and system library and the kernel layer below the application framework layer may be referred to as an underlying system. The underlying system includes an underlying display system used to provide a display service. The underlying display system may include but is not limited to a surface manager in the system library and a display driver at the kernel layer.

The runtime is responsible for scheduling and managing the entire software system, and includes a core library and a virtual machine. Computer programs at the application layer and the application framework layer run on the virtual machine. Furthermore, the virtual machine may execute Java files of the application layer and the application framework layer as binary files. The system library may further include a plurality of function modules in addition to the surface manager, for example, a status monitoring service, a media library, a 3D graphics engine (for example, OpenGL for Embedded Systems), and a two-dimensional (2D) graphics engine. The surface manager may provide fusion of 2D graphics and 3D graphics for various applications. The status monitoring service may receive data reported by each driver at the kernel layer. The media library may support playback and collection of images/audio/videos in a plurality of common formats. The 3D graphics engine is configured to implement drawing, rendering, and compositing of a 3D image. The 2D graphics engine is configured to implement drawing and rendering of a 2D image.

The kernel layer is a layer between hardware and software, and the kernel layer includes several hardware drivers. For example, the kernel layer may include a display driver, a camera driver, an audio driver, and a touch control driver. Each driver may collect information collected by corresponding hardware, and report corresponding monitoring data to the status monitoring service or other function modules in the system library.

Figure 3A:
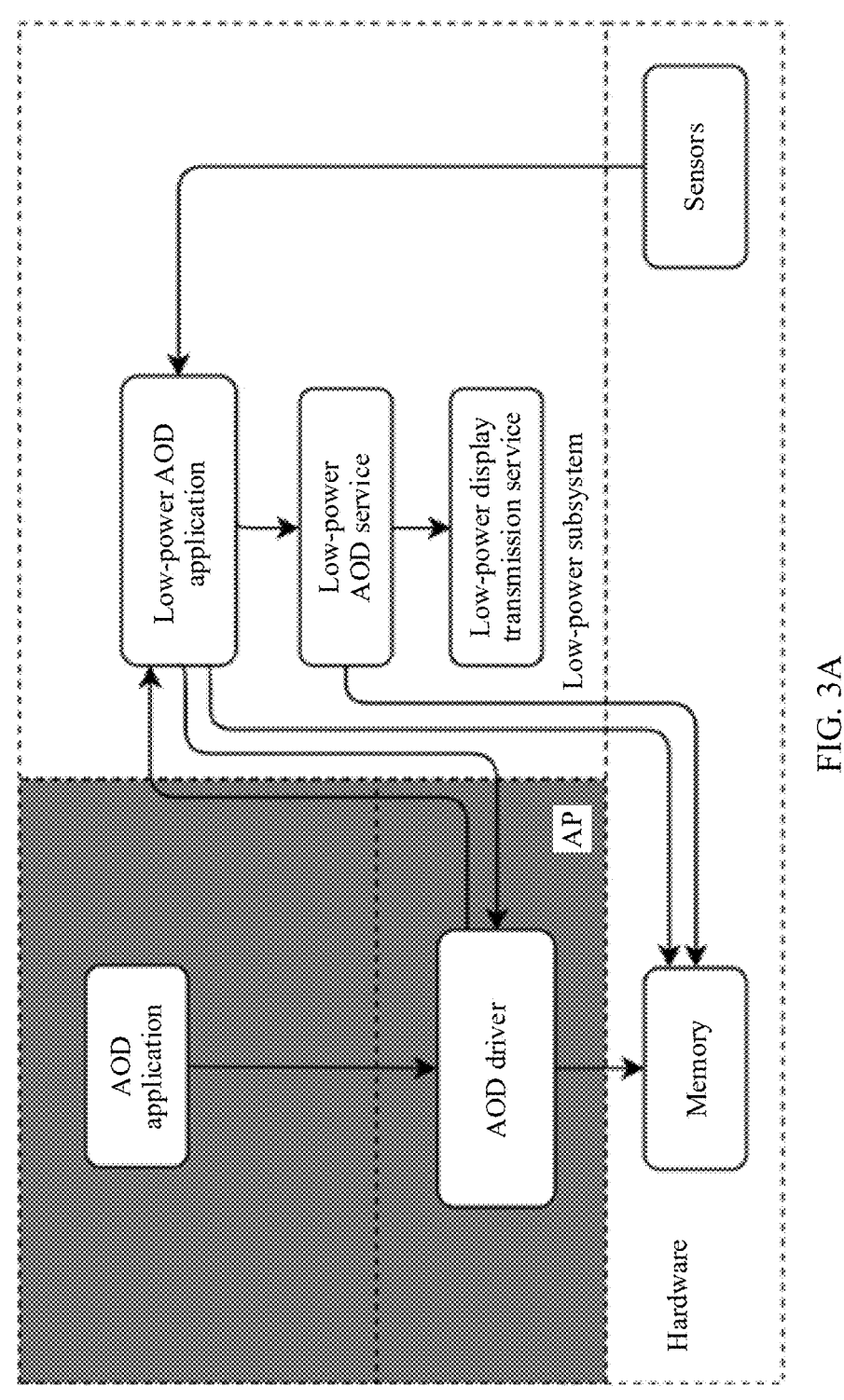
FIG. 3A is a schematic diagram of a hardware structure of a terminal device according to an embodiment of this disclosure.

FIG. 3A is a schematic diagram of a hardware structure of a terminal device according to an embodiment of this disclosure. As shown in FIG. 3A, the terminal device such as a mobile phone includes an application processor (AP) and a coprocessor (sensor hub processor (SHP) intelligent sensor hub). The SHP is mainly configured to obtain, integrate and process sensor data, and separate sensor-related processing from a main central processing unit (CPU). After a main application processor sleeps, the processor is still working to realize a function of display synthesis and frame animation playback, so as to reduce power consumption of the main CPU. The AP may include an AOD application module and an AOD driver module. The SHP may include a low-power AOD application module, a low-power service module, and a low-power display transmission module.

The AOD application module is used by the user to select an always-on display switch and an AOD style, and customize dynamic content (such as a Graphics Interchange Format (GIF) format or another format animation). The AOD style may include a dynamic content display duration and an event (for example, touching the screen) that triggers dynamic display. In addition, the AOD application module is further configured to decompose the AOD style selected by the user, that is, convert the AOD style into an animation basic resource picture (for example, a dynamic format set by the user, such as a video, a GIF, and a LivePhoto animation, can be parsed into a plurality of frames of sequence pictures) and information that identifies a type of a display control, a relationship between controls, and control rules (such as a trigger event parameter), and delivers the information to the low-power AOD application module through the AOD drive module when the screen-off interface is displayed. Further, when the screen-off interface is displayed, the AOD application module applies for a shared segment of memory (frame buffer) by using the AOD driver module, writes the animation basic resource picture into the shared memory, and delivers an AOD instruction to the low-power AOD application module by using the AOD driver module. The shared memory is a shared memory of the AP and the SensorHub, and is used to store dynamic content and static content during the always-on display period.

The AOD driver module is used to provide a dedicated interface, so that the AOD application module writes the frame sequence pictures parsed by the AOD application module into a shared memory and delivers the AOD instruction (including a shared memory address, an animation duration, a playback frame rate, a display control type and a relationship between controls, and a trigger event, such as whether to respond to a touch, move, and gazing by human eyes) to a low-power subsystem in the SensorHub, such as the low-power AOD application module. The AOD driver module communicates with the low-power AOD application module in the SensorHub according to an inter-process communication (IPC) communication protocol.

Further, the following operation steps may be performed. First, the user enters an always-on display setting interface, and selects a display mode as intelligent display. Next, the user selects a screen-off style, such as a bird style or a custom GIF animation. In this case, the AOD application module parses the style selected by the user, parses a dynamic content display duration (for example, 5 seconds(s)) configured by the system based on this scenario, associates the style with a corresponding trigger event type, for example, a touch event, a motion event, or a human eye gazing event, analyzes display controls of this style and a relationship between the display controls. The display controls include a digital clock display control, a date component, a Chinese calendar component, a battery level component, and a background component. When the AOD style is a dynamic style of a bird pattern, the animation basic resource picture is composed of a plurality of consecutive frames of pictures. When the screen-off interface is displayed, the AOD driver module applies for a shared memory, writes a plurality of frames of dynamic pictures to the shared memory, and records a memory address and offset of each frame of picture in the memory. Then, the AOD driver module delivers the display controls, the relationship between the display controls, the associated event type, the memory address, the image sequence, and the offset in the memory to low-power subsystems by using the AOD driver module, such as the low-power AOD application module and the low-power service module.

The low-power AOD application module receives the data sent by the AOD application module through the dedicated interface provided by the AOD driver, parses the data, obtains the memory address for storing the animation basic resource picture and an always-on display rule, and controls the screen to enter the low-power display mode according to the always-on display rule. Further, when identifying, based on the memory address, that the shared memory includes the frame animation resource, the low-power AOD application module reads the animation basic resource from the shared memory, and uses a specific algorithm to determine, based on data or events collected by various sensors, whether a screen shaking event or a screen touching event, an optical proximity changing event, or a human eye gazing event occurs, so as to trigger or stop the always-on display animation. For example, when a light detected by an optical proximity sensor is reduced (for example, the mobile phone is placed in a pocket, and the optical proximity sensor is blocked), the always-on display is stopped and the screen goes black. When the light detected by the optical proximity sensor increases (for example, the mobile phone is taken out of the pocket, the optical proximity sensor is no longer blocked), the always-on display continues to be performed according to the always-on display rule. Alternatively, dynamic AOD display is triggered when it is detected that human eyes gaze at the screen, and dynamic AOD display is stopped when the human eyes do not gaze at the screen.

The low-power AOD service module provides a display synthesis capability and synthesizes various resource information to be displayed into final display content. During the always-on display period, the low-power service module synthesizes various display controls delivered by the AOD application module in real time, for example, fills a current time into the time component and synthesizes the time with the date component, the Chinese calendar component and the dynamic picture, and transmits display content to the screen through the interface provided by the low-power display transmission module. During a dynamic always-on display process, the dynamic picture is changing, so as to realize dynamic always-on display. The low-power display transmission module transfers the information of the low-power AOD service module to the screen for display.

The terminal device in embodiments of this disclosure does not need to wake up a system (the application processor sleeps), and supports dynamic always-on display based on a coprocessor (SensorHub processor), so that power consumption of the terminal device is reduced. The terminal device may not only be a mobile phone, but also may be an electronic device having a screen 194, such a tablet computer, a notebook computer, an ultra-mobile personal computer (UMPC), a handheld computer, a netbook, a personal digital assistant (PDA), a wearable device, or a virtual reality device. This is not limited in embodiments of this disclosure.

Figure 3B:
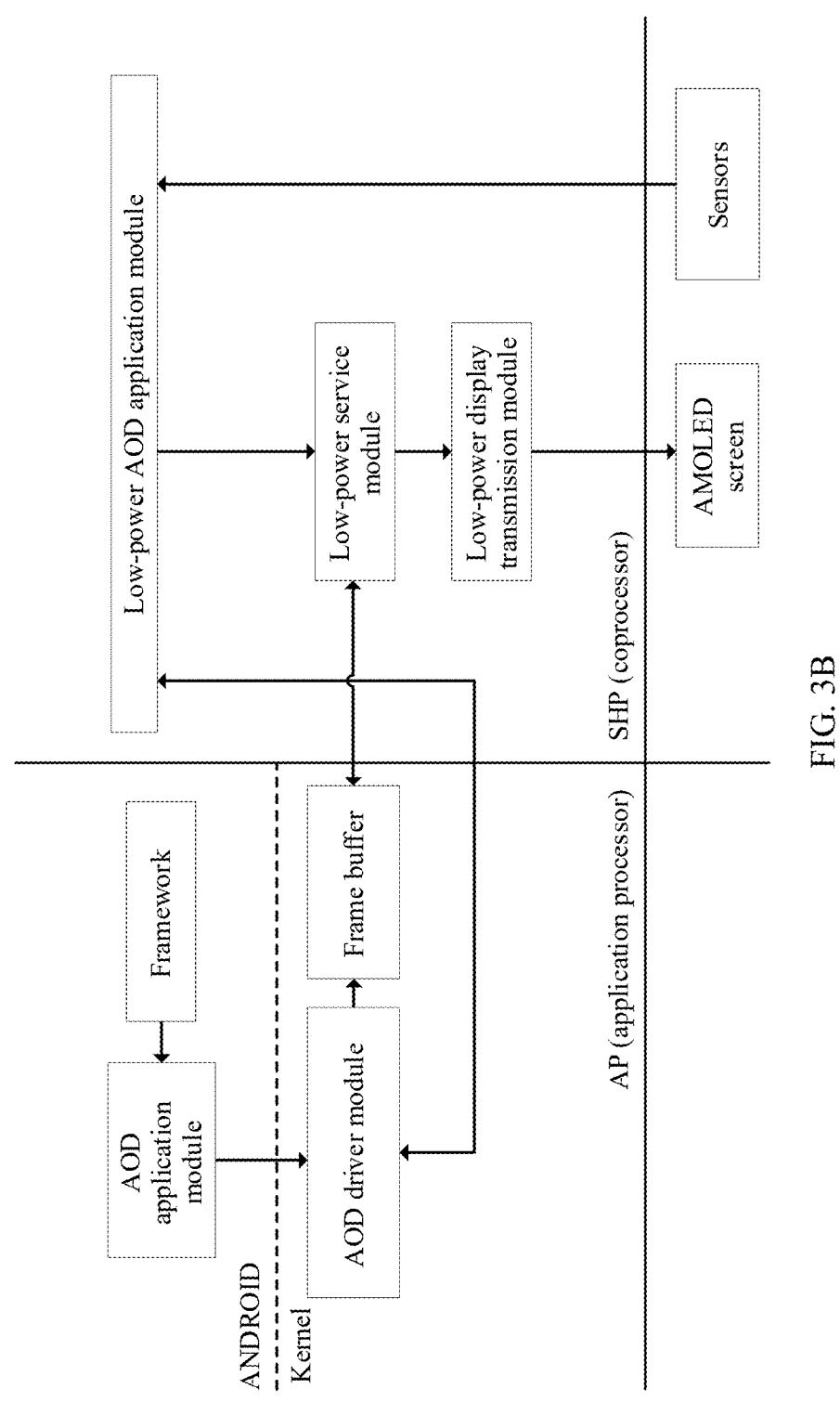
FIG. 3B is a schematic diagram of a structure of a software system of the terminal device in FIG. 3A.

FIG. 3B is a schematic diagram of a structure of a software system of the terminal device in FIG. 3A. As shown in FIG. 3B, the AP is a processor in which the AOD application module runs. For example, the AP is based on an ANDROID system. The AOD application module is at an ANDROID application layer, and communicates with the SensorHub by using a driver at a kernel layer. By applying for the shared memory (frame buffer), the dynamic content set by the user is converted into a plurality of frames of animation pictures and written into the shared memory. Then, the memory address and event parameters that can be responded by the user after the screen-off interface is displayed are delivered to a low-power application of the SensorHub. For example, on a mobile phone, a user selects a GIF image. After a system sleeps and a screen is off, the GIF animation is cyclically played on the screen, or the GIF animation is played on the screen when the user taps the screen or moves the mobile phone to trigger the always-on display. The low-power system in SensorHub synthesizes different display contents into pictures and sends the pictures to a display system to achieve a dynamic effect in a sleep state of the application processor. In other words, a dynamic always-on display effect is implemented based on the SensorHub coprocessor, does not need to wake up the system, and is not implemented by using an ANDROID display process, so that power consumption is far lower than that of an existing AOD solution. When the system is in a sleep mode, the always-on display content can be refreshed based on a user behavior. For different user behaviors, such as touching, moving, and eye gazing, different screen-off content is displayed. Therefore, when the system is in the sleep mode, the always-on display can be refreshed dynamically, which brings obvious power consumption benefits.

Figure 3C:
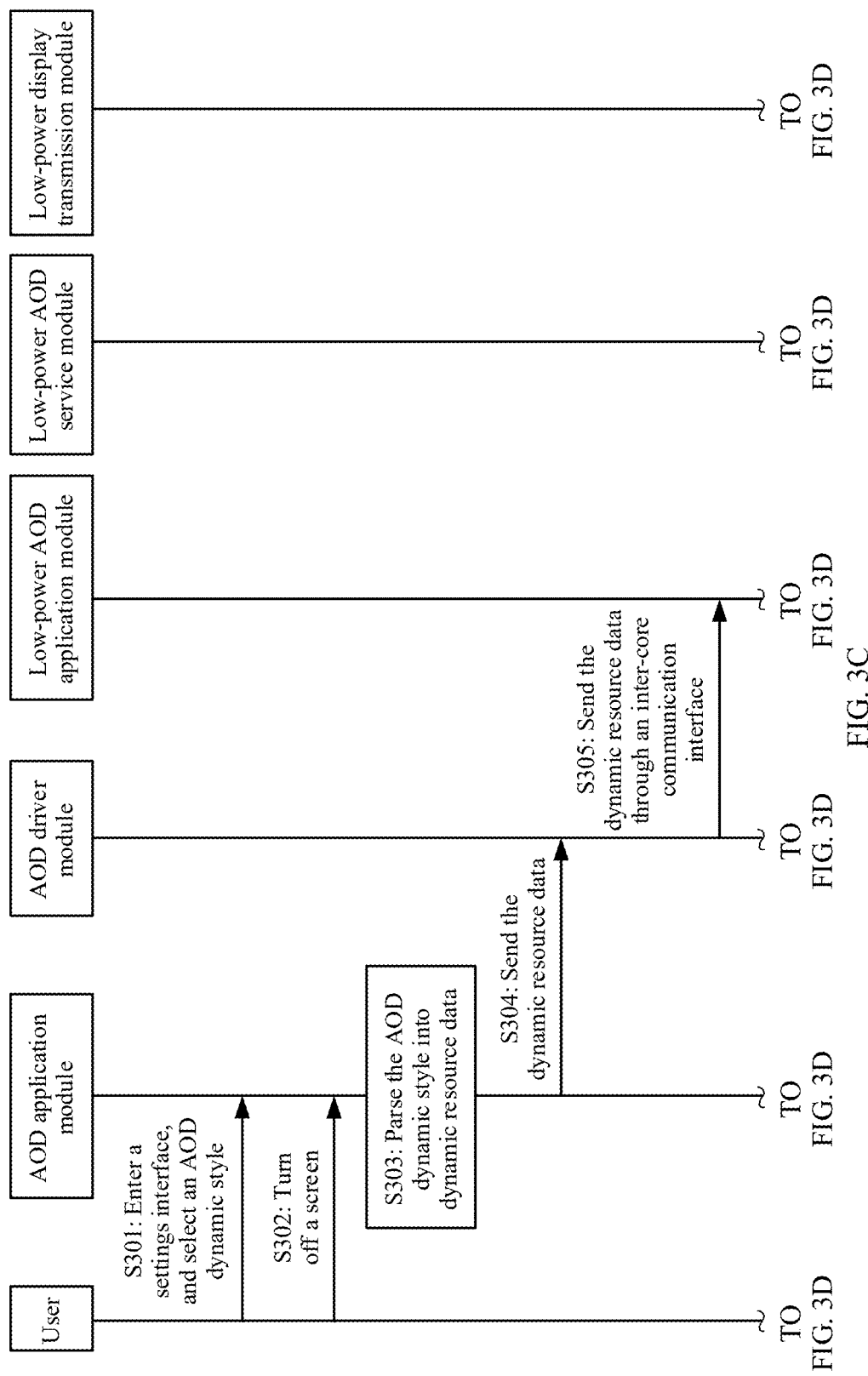
FIG. 3C and FIG. 3D are a flowchart when the terminal device in FIG. 3A and FIG. 3B performs always-on display.
Figure 3D:
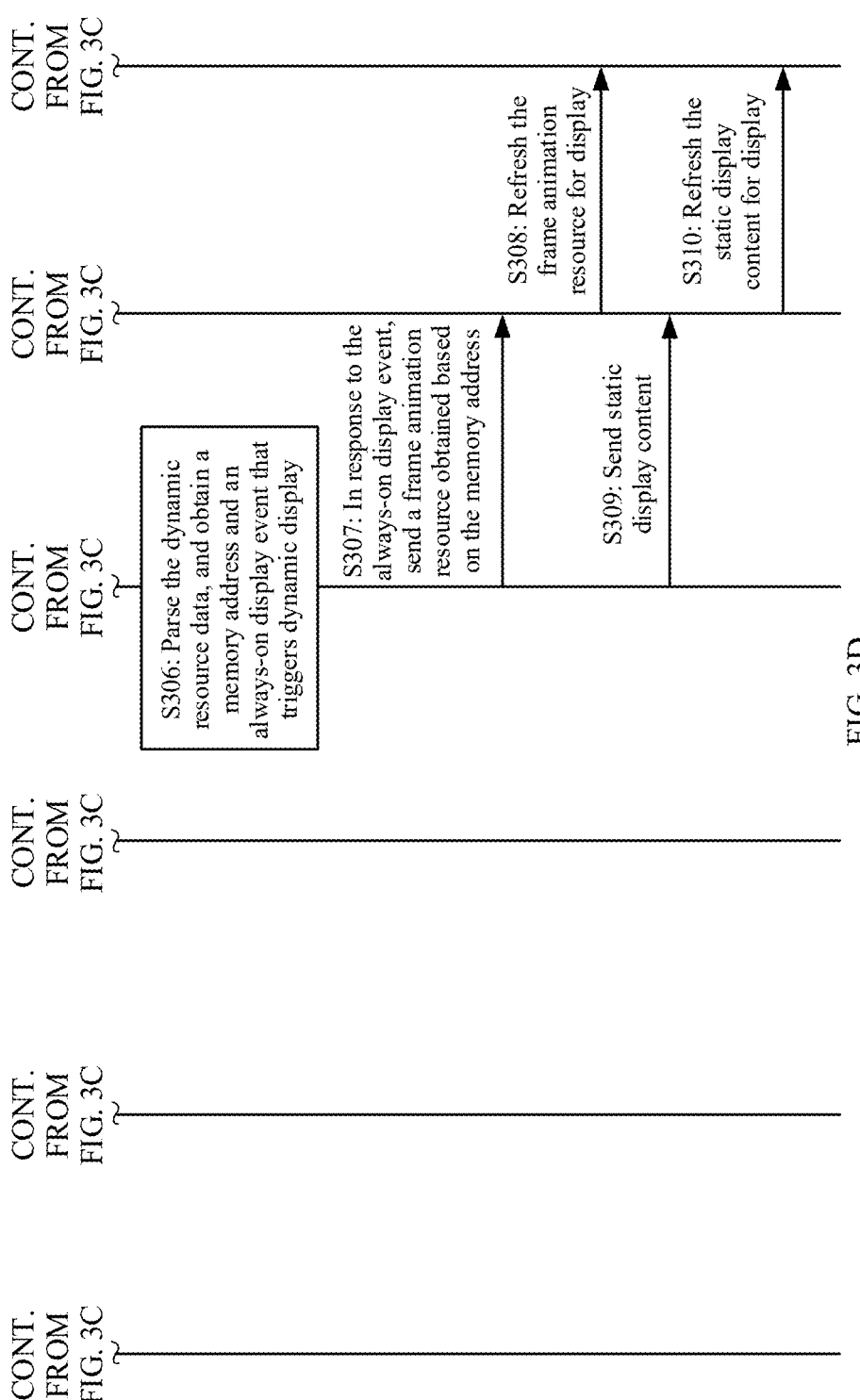

FIG. 3C and FIG. 3D are a flowchart when the terminal device in FIG. 3A and FIG. 3B performs always-on display. As shown in FIG. 3C and FIG. 3D, the always-on display may include the following steps:

Step S301: A user enters a settings interface, and selects an AOD dynamic style.

Step S302: The user turns off a screen.

Step S303: An AOD application module parses the AOD dynamic style into dynamic resource data.

Step S304: The AOD application module sends the dynamic resource data to an AOD driver module.

Step S305: The AOD driver module sends the dynamic resource data to a low-power AOD application module by using an inter-core communication interface.

Step S306: The low-power AOD application module parses the dynamic resource data, and obtains a memory address and an always-on display event that triggers dynamic display, where the memory address indicates a location for storing a frame animation resource.

Step S307: The low-power AOD application module sends, in response to the always-on display event, the frame animation resource obtained based on the memory address to a low-power AOD service module.

Step S308: The low-power AOD service module refreshes the frame animation resource displayed by a low-power display transmission module.

Step S309: The low-power AOD application module sends static display content to the low-power AOD service module. The static display content may be a time point, a date, a Chinese calendar, a battery level, and the like. In addition, a type of the static display content may be preset in the low-power AOD application module. Alternatively, an instruction for specifying the type may be sent by the AOD application module to the low-power AOD application module together with the dynamic resource data by using an interface provided by the AOD driver module.

Step S310: The low-power AOD service module refreshes the static display content displayed by the low-power display transmission module.

In addition, step S307 and step S309 may be performed simultaneously, and step S308 and step S310 may be performed simultaneously.

For example, in a sleep state of a system, a dynamic effect of a butterfly waving wings may be displayed. Alternatively, in a user interaction scenario, a dynamic effect of a butterfly waving wings may be displayed after tapping a screen, moving a mobile phone, or gazing at a screen by a human eye. The following describes the application scenario in detail by using an example in which the dynamic content is a bird.

First Application Scenario:

1. A user selects intelligent display. After a screen is off, no content is displayed. A system enters a sleep mode.

2. When the user touches the screen or moves a mobile phone, the system is still in a sleep state, but static display content such as a time point and a date is displayed. After a bird flies on the screen for a period of time, no content is displayed on the screen.

Second Application Scenario:

1. A user selects all-day display or scheduled display. After a screen is off, a system sleeps. Static display content such as a time point and a date is displayed on the screen. A bird flies (dynamic display) on the screen for a specific period of time and disappears, and then only static display content such as a time point and a date is displayed.

2. When the user touches the screen or moves a mobile phone, the system is still in a sleep state, but the dynamic display starts. After the bird flies on the screen for a period of time, only static display content such as a time point and a date is displayed.

Figure 4:
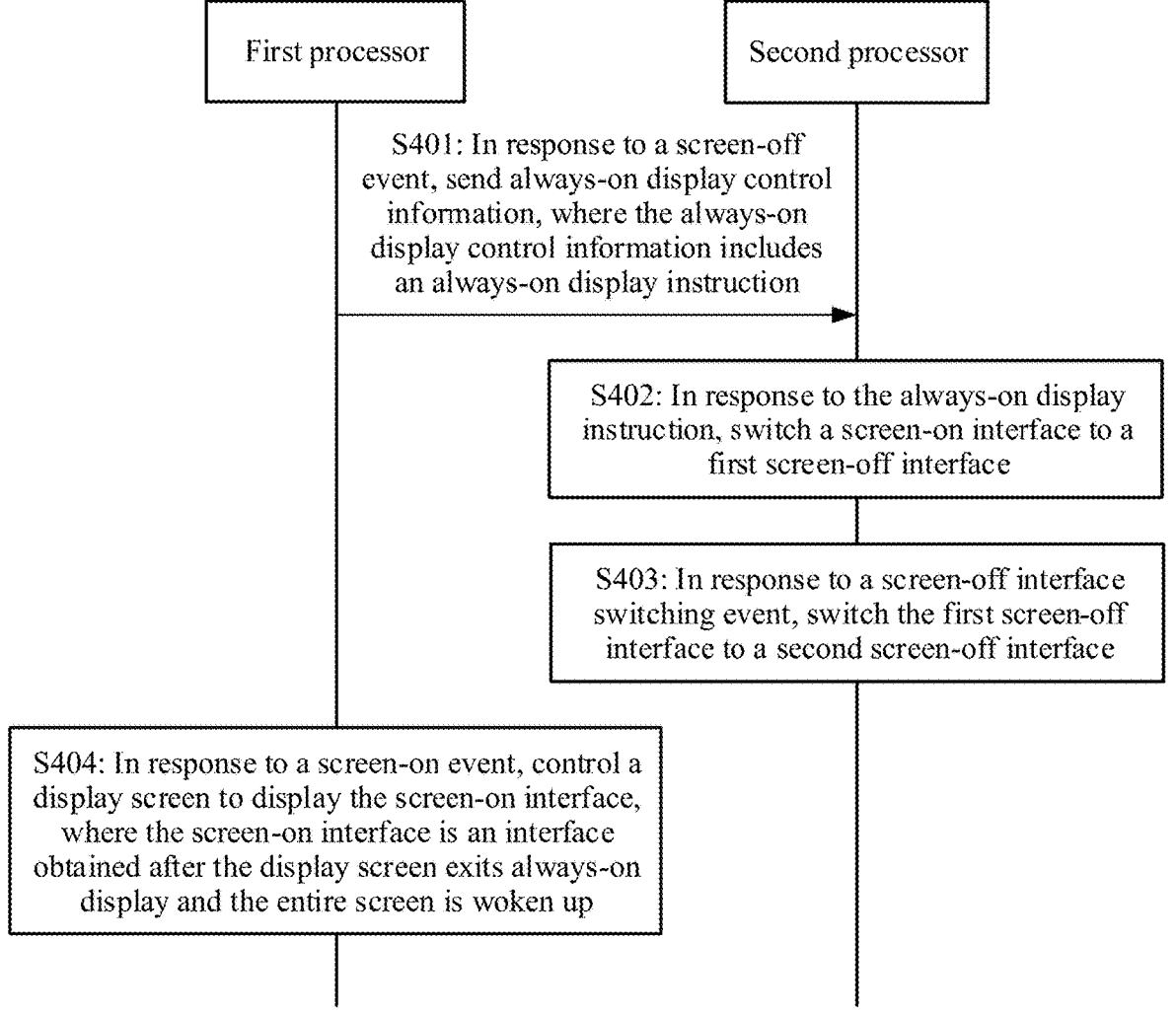
FIG. 4 is a flowchart of an always-on display method according to an embodiment of this disclosure.

FIG. 4 is a flowchart of an always-on display method according to an embodiment of this disclosure. The always-on display method is applied to a terminal device that includes a display screen, a first processor, and a second processor. The first processor may be a main processor (or an application processor), and the second processor may be a coprocessor. As shown in FIG. 4, the always-on display method includes the following steps.

Step S401: In response to a screen-off event, the first processor sends always-on display control information to the second processor, where the always-on display control information includes an always-on display instruction, and the first processor enters a sleep mode after sending the always-on display control information to the second processor. The screen-off event may be an event that causes the display screen to enter a screen-off state, and includes that no user operation is received within predetermined duration or a power button is pressed when the screen-on interface is displayed.

In response to the always-on display instruction, the second processor controls a screen-off interface of the display screen. Further, the second processor controls the screen-off interface of the display screen according to an always-on display rule. The always-on display rule is carried in the always-on display control information. Alternatively, the always-on display rule is preset in the second processor. The always-on display rule includes a first always-on display rule and a second always-on display rule.

Step S402: In response to the always-on display instruction, the second processor switches a screen-on interface to a first screen-off interface. The first screen-off interface is determined by the second processor according to the first always-on display rule.

Step S403: In response to a screen-off interface switching event, the second processor switches the first screen-off interface to a second screen-off interface. The second screen-off interface is determined by the second processor according to the second always-on display rule.

Display content of at least one of the first screen-off interface and the second screen-off interface includes a dynamic picture. The dynamic picture may be a bird or a butterfly flying on the screen, a text moving on the screen, or the like. The screen-off interface switching event is one of a screen touching event, a terminal device moving event (a terminal device is moved), and a screen gazing event.

If no user operation is received within predetermined duration or the power button is pressed when the screen-on interface is displayed, the first processor sends the always-on display control information to the second processor, and then the first processor enters the sleep mode. The second processor controls, according to the first always-on display rule, the display screen to display the first screen-off interface. When one of the screen touching event, the terminal device moving event, and the screen gazing event occurs, the second processor switches the first screen-off interface to the second screen-off interface.

In this way, during an always-on display period, the first processor does not need to be woken up periodically, and the second processor can control, according to at least one of the first always-on display rule and the second always-on display rule in the always-on display control information sent by the first processor, the display screen to play the dynamic picture. Therefore, a user experience effect is improved, and a user requirement can be better met. In addition, because the second processor may select a low-power processor, power consumption can be significantly reduced compared with a manner in which screen display is controlled by using the first processor during the always-on display period.

Step S404: In response to a screen-on event, the first processor controls the display screen to display the screen-on interface, where the screen-on interface is an interface obtained after the display screen exits always-on display and the entire screen is woken up, and the screen-on event includes tapping the power button or a fingerprint button when the screen-off interface is displayed. When the always-on display is performed, the power button on a side of the terminal device such as a mobile phone or the fingerprint button on the front of a screen of the mobile phone may be tapped to switch the screen-off interface to the screen-on interface.

The following describes an embodiment of an always-on display method in this disclosure with reference to the Table. In the Table, "text" refers to text information, and "dynamic effect" refers to a dynamic picture.

TABLE

| | | 1 | 2 | 3 | 4 | 5 | 6 | 7 |
|---|---|---|---|---|---|---|---|---|
| Respond to an always-on display instruction | Within predetermined duration | Black screen | Dynamic effect | Text | | | Text + dynamic effect | Dynamic effect |
| | Beyond predetermined duration | | Black screen | Text | Black screen | Text | Black screen | Black screen |

TABLE-continued

|  |  | 1 | 2 | 3 | 4 | 5 | 6 | 7 |
|---|---|---|---|---|---|---|---|---|
| Respond to a screen-off interface switching event | Within predetermined duration | Dynamic effect | | Text + dynamic effect | 1. Dynamic effect; or 2. Dynamic effect + text | Text + dynamic effect | Text and/or dynamic effect (3 types) | 1. Text; or 2. Text + dynamic effect |
|  | Beyond predetermined duration | Black screen | | Text | Black screen (or text) | Text | Black screen (or text) | 1. Text; or 2. Black screen |

Figure 5:
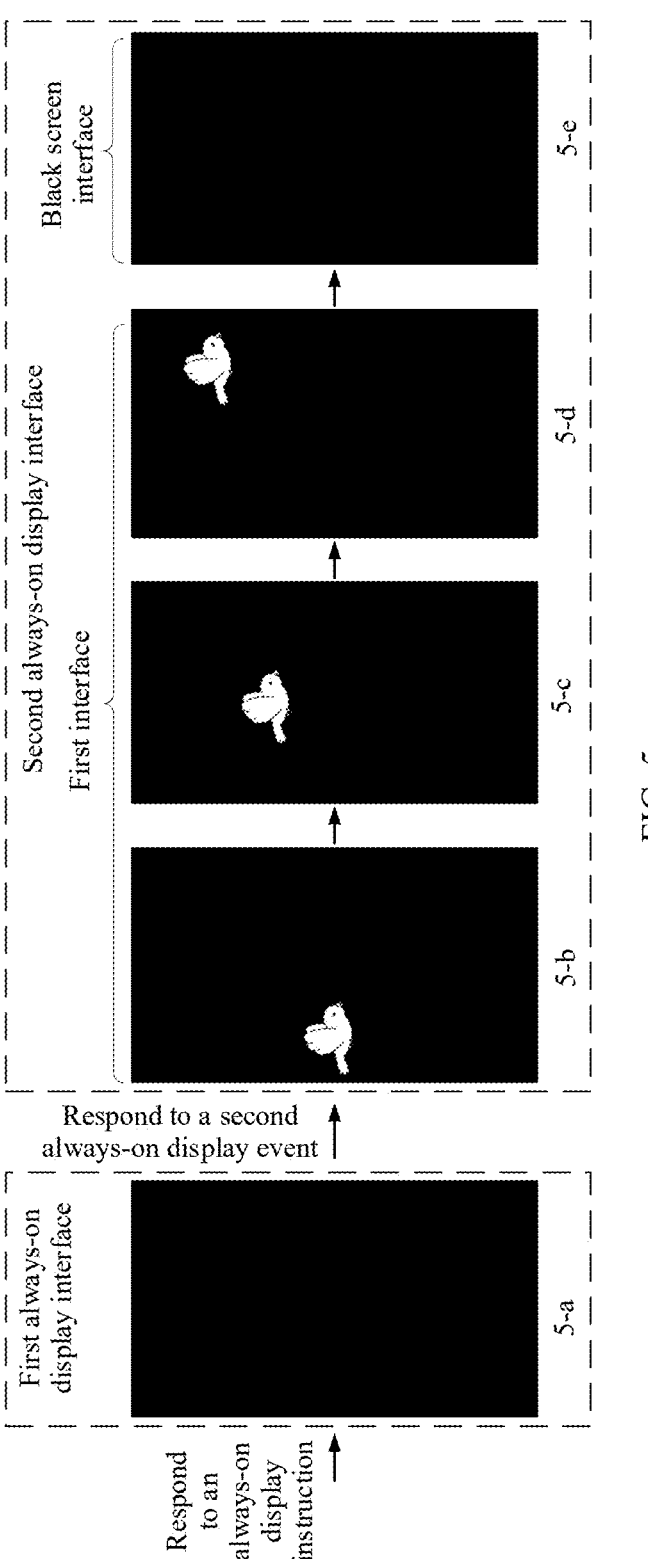
FIG. 5 is a schematic diagram of a first application scenario of an always-on display method according to an embodiment of this disclosure.

FIG. 5 is a schematic diagram of a first application scenario of an always-on display method according to an embodiment of this disclosure. As shown in FIG. 5, a first screen-off interface is a black screen interface shown in 5-*a* in FIG. 5. The black screen interface means that a display screen goes black or the display screen enters a black screen state. The first always-on display rule includes controlling the display screen to keep black continuously. As shown in the Table, the second processor controls the screen to display the black screen interface within and beyond predetermined duration when the always-on display instruction is received, as shown in 5-*a* in FIG. 5. A second screen-off interface includes a first interface and a black screen interface. Display content of the first interface includes a dynamic picture as shown in 5-*b*, 5-*c*, and 5-*d* in FIG. 5. The second always-on display rule includes switching to the black screen interface shown in 5-*e* in FIG. 5 after the first interface is displayed for predetermined duration. As shown in the Table, after receiving the screen-off interface switching event, the second processor plays a dynamic picture shown in 5-*b* to 5-*e* in FIG. 5 within predetermined duration. After predetermined duration expires (beyond predetermined duration), the second processor controls the screen to go black, as shown in 5-*e* in FIG. 5.

Figure 6:
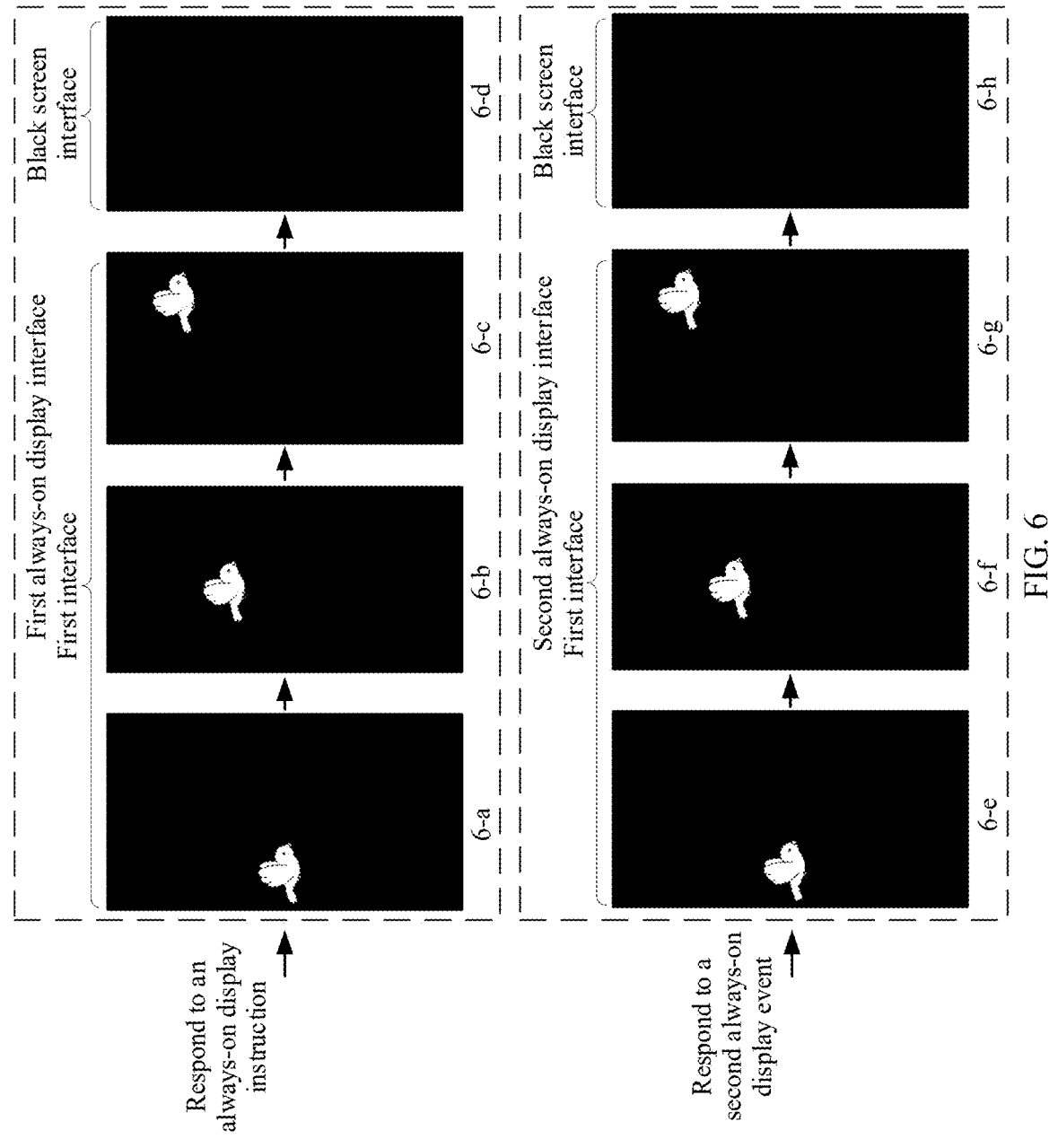
FIG. 6 is a schematic diagram of a second application scenario of an always-on display method according to an embodiment of this disclosure.

FIG. 6 is a schematic diagram of a second application scenario of an always-on display method according to an embodiment of this disclosure. As shown in FIG. 6, the first screen-off interface and the second screen-off interface each include a first interface and a black screen interface. Display content of the first interface includes a dynamic picture. Both the first always-on display rule and the second always-on display rule include switching to the black screen interface after the first interface is displayed for predetermined duration. In response to the always-on display instruction, the second processor controls the screen to play the dynamic picture within predetermined duration, as shown in 6-*a* to 6-*c* in FIG. 6, and controls the screen to go black after predetermined duration expires, as shown in 6-*d* in FIG. 6. After receiving the screen-off interface switching event, the second processor controls the screen to play the dynamic picture within predetermined duration, as shown in 6-*e* to 6-*g* in FIG. 6, and controls the screen to go black when predetermined duration expires, as shown in 6-*h* in FIG. 6.

In addition, the display content of at least one of the first screen-off interface and the second screen-off interface may further include text information that is of a text display control and that changes with time. The always-on display can support static content display, can also support dynamic effect display. A type of the text display control includes at least one of a time point control, a date control, a battery level control, and a Chinese calendar control. For example, the text display control includes a time point control and a date control. Further, a time point displayed on the time point control may be "08:08", and a date displayed on the date control may be "November 22". Text information of each type of the text display control may occupy one layer. That is, "08:08" may occupy the first layer and "November 22" may occupy the second layer. Alternatively, text information of each of the text display control may occupy more than two layers. That is, "08:" in "08:08" may occupy the first layer, and "08" in "08:08" may occupy the second layer. In addition, one type of text display control can be displayed on each layer. That is, only the time point "08:08" can be displayed on the first layer. Alternatively, more than two types of text display controls can be displayed on each layer. That is, the time point "08:08" and the date "November 22" can be displayed on the first layer at the same time.

When the display screen includes text information, the always-on display method in this disclosure further includes the following embodiment.

Figure 7:
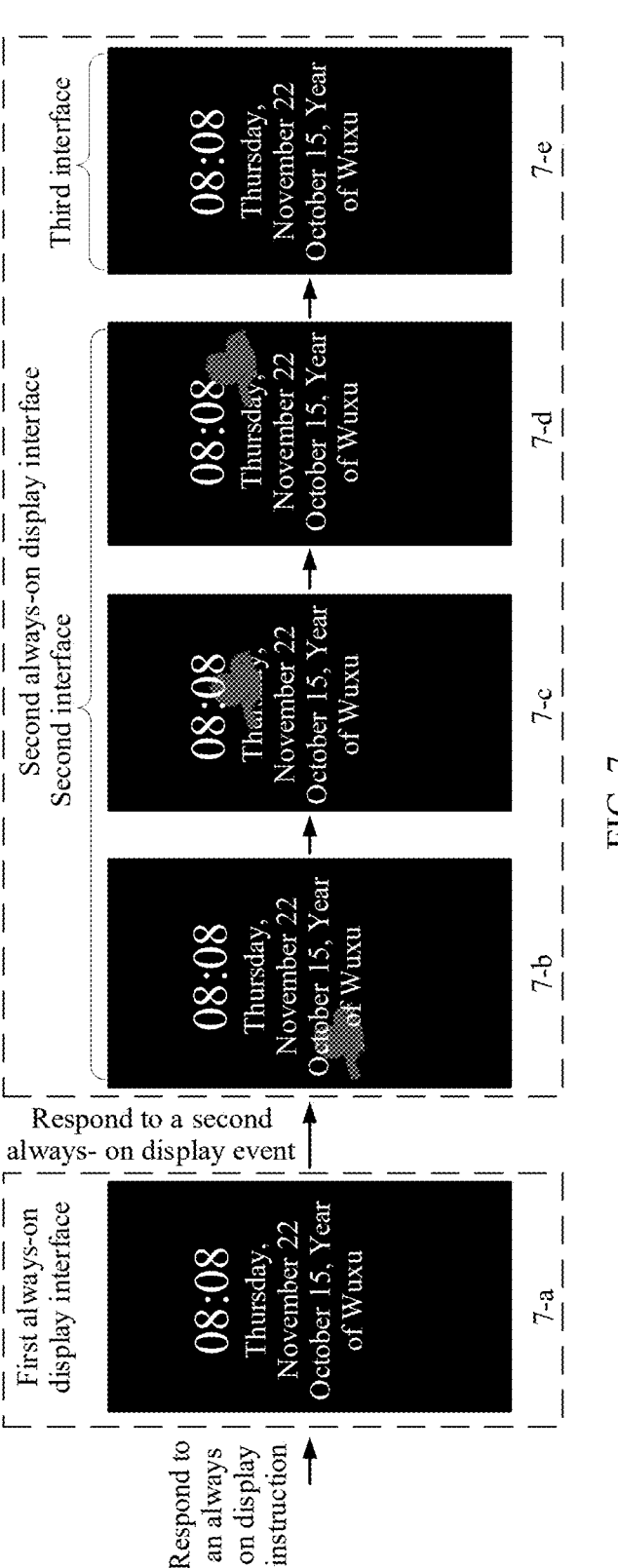
FIG. 7 is a schematic diagram of a third application scenario of an always-on display method according to an embodiment of this disclosure.

FIG. 7 is a schematic diagram of a third application scenario of an always-on display method according to an embodiment of this disclosure. As shown in FIG. 7, the first screen-off interface includes text information, and the first always-on display rule includes continuously displaying the text information. The second screen-off interface includes a second interface and a third interface. Display content of the second interface includes the text information and the dynamic picture. Display content of the third interface includes text information, and the second always-on display rule includes switching to display the third interface after the second interface is displayed for predetermined duration. Further, in FIG. 7, the text information includes a time point "08:08", a date "Thursday, November 22", and a Chinese calendar "October 15, Year of Wuxu". When receiving the always-on display instruction, the second processor controls the screen to continuously display the text information, as shown in 7-*a* in FIG. 7. When receiving the screen-off interface switching event, the second processor controls the screen to play a dynamic picture within predetermined duration, as shown in 7-*b* to 7-*d* in FIG. 7. After predetermined duration expires, the control screen displays the text information as shown in 7-*e* in FIG. 7.

FIG. 8 is a schematic diagram of a fourth application scenario of an always-on display method according to an embodiment of this disclosure. As shown in FIG. 8, the first screen-off interface includes a second interface and a black screen interface, the second interface includes the text information, and the second always-on display rule includes switching to the black screen interface after the second interface is displayed for predetermined duration. The second screen-off interface includes a third interface and a black screen interface, display content of the third interface includes the text information and the dynamic picture, and the second always-on display rule includes switching to the black screen interface after the third interface is displayed for predetermined duration. After receiving the always-on display instruction, the second processor controls the screen to display the text information within predetermined duration, as shown in 8-*a* in FIG. 8, and controls the screen to go black after predetermined duration expires, as shown in 8-*b* in FIG. 8. After receiving the screen-off interface switching event, the second processor controls the screen to display the text information and play the dynamic picture within predetermined duration, as shown in 8-*c* to 8-*e* in FIG. 8, and controls the screen to go black after predetermined duration expires, as shown in 8-*f* in FIG. 8.

Alternatively, as shown in the Table, in a fourth application scenario, display content of the third interface includes only the dynamic picture. In response to the always-on display instruction, the second processor controls the screen to go black after displaying the text information for predetermined duration. After receiving the screen-off interface switching event, the second processor controls the screen to play only the dynamic picture within predetermined duration, and controls the screen to go black when predetermined duration expires.

In addition, the always-on display control information may further include a stacking order, where the stacking order indicates an arrangement order of each frame of the dynamic picture and the text information. The stacking order includes locating at least one frame of the dynamic picture below the text information at a first moment as shown in 8-*c* in FIG. 8 and/or locating at least one frame of the dynamic picture above the text information at a second moment as shown in 8-*e* in FIG. 8. Because at least one frame of the dynamic picture is located below the text information at the first moment, and at least one frame of the dynamic picture is located above the text information at the second moment, a 3D effect in which the dynamic picture traverses from the bottom of the text information to the top of the text information can be formed from the first moment to the second moment, and user experience can be improved.

Further, each frame of the dynamic picture may include M layers, where M is greater than or equal to 2. The stacking order further includes that the text information is located between adjacent layers of the M layers at a third moment. Each frame of the dynamic picture may include at least two layers, each layer includes a part of the pattern, and the M layers may be stacked layer by layer to form the complete pattern. The text information is located between adjacent layers of the M layers at the third moment, a pattern in which a part of the dynamic picture is located under the text information and a part of the dynamic picture is located above the text information can be formed, so that a 3D effect of the dynamic picture at the third moment may be more prominent. Further, as shown in 8-*d* in FIG. 8, a lower body of the bird is located above the date "Thursday, November 22", and wings of the bird are located below the time point "08". The date is located at a lowest layer, the time point is located at a top layer, and the bird is located between a layer of the date and a layer of the time point.

Figure 9:
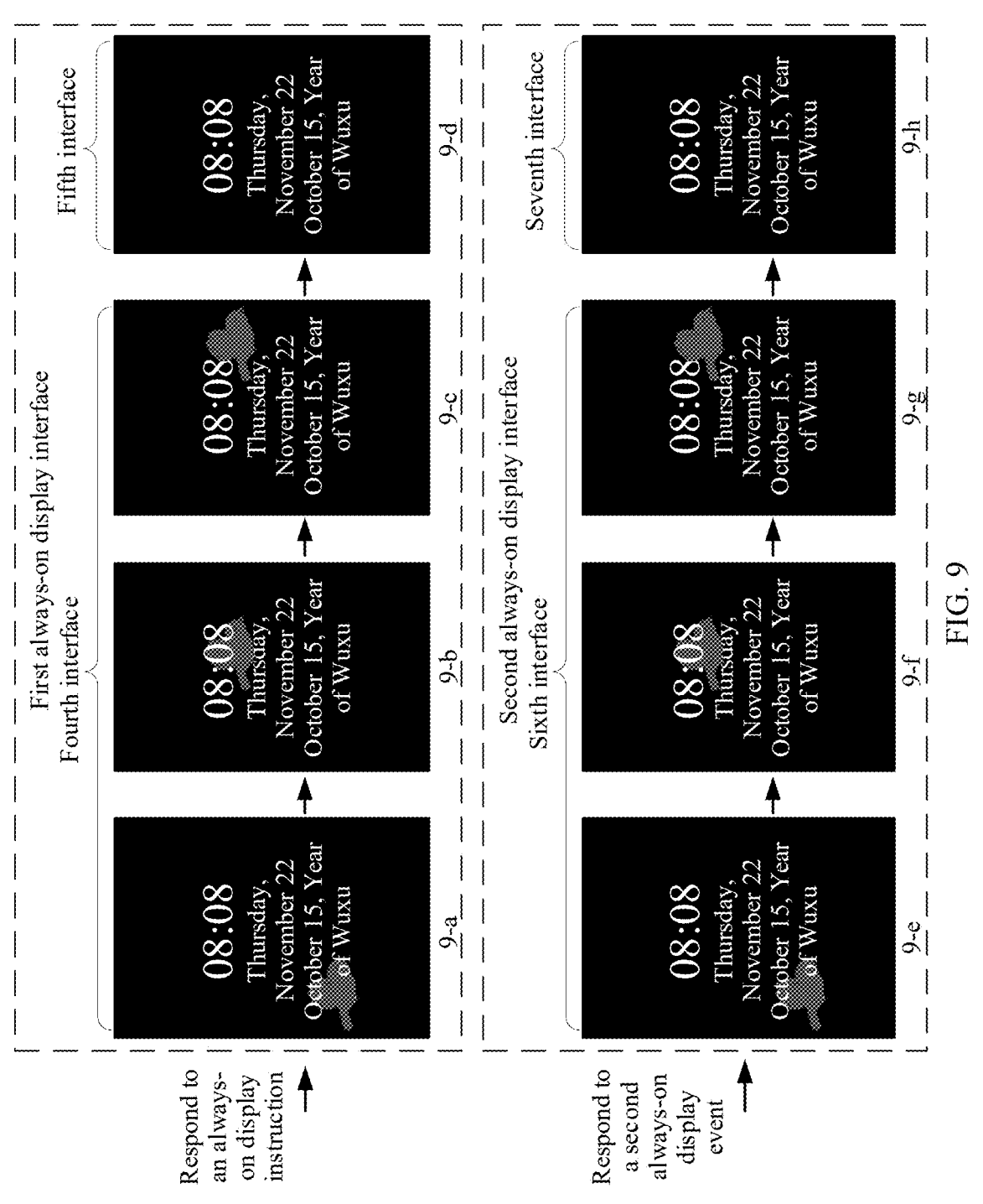
FIG. 9 is a schematic diagram of a fifth application scenario of an always-on display method according to an embodiment of this disclosure.

FIG. 9 is a schematic diagram of a fifth application scenario of an always-on display method according to an embodiment of this disclosure. As shown in FIG. 9, the first screen-off interface includes a fourth interface and a fifth interface, the fourth interface includes the text information and the dynamic picture, display content of the fifth interface includes the text information, and the first always-on display rule includes switching to display the fifth interface after the fourth interface is displayed for predetermined duration. The second screen-off interface includes a sixth interface and a seventh interface, the sixth interface includes the text information and the dynamic picture, display content of the seventh interface includes the text information, and the second always-on display rule includes switching to display the seventh interface after the sixth interface is displayed for predetermined duration. After receiving the always-on display instruction, the second processor controls the screen to display the text information and play the dynamic picture within predetermined duration, as shown in 9-*a* to 9-*c* in FIG. 9, and controls the screen to display only the text information after predetermined duration expires, as shown in 9-*d* in FIG. 9. After receiving the screen-off interface switching event, the second processor controls the screen to display the text information and play the dynamic picture within predetermined duration, as shown in 9-*e* to 9-*g* in FIG. 9, and controls the screen to go black after predetermined duration expires, as shown in 9-*h* in FIG. 9.

Figure 10:
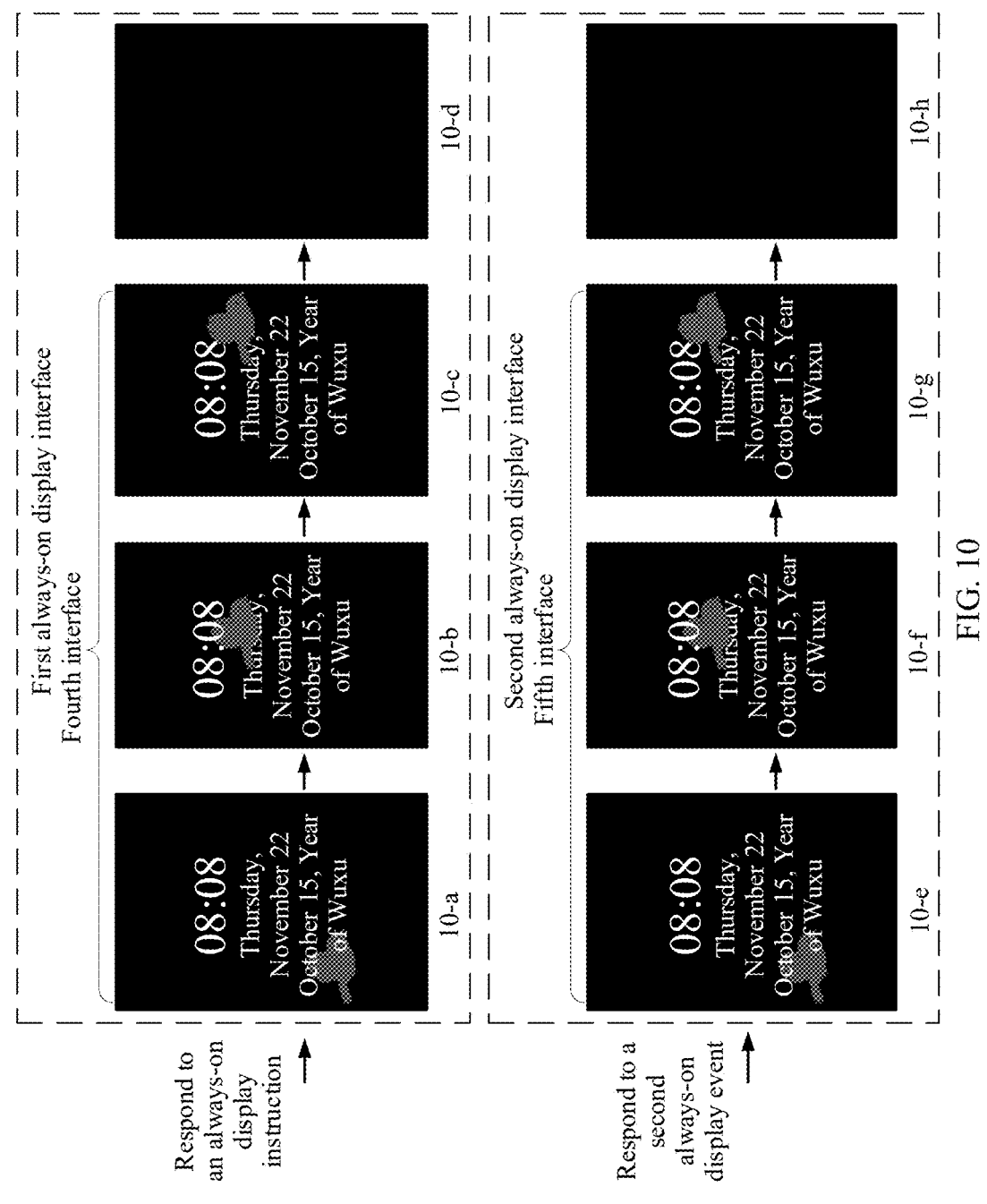
FIG. 10 is a schematic diagram of a sixth application scenario of an always-on display method according to an embodiment of this disclosure.

FIG. 10 is a schematic diagram of a sixth application scenario of an always-on display method according to an embodiment of this disclosure. As shown in FIG. 10, the first screen-off interface includes a fourth interface and a black screen interface, the fourth interface includes the text information and the dynamic picture, and the first always-on display rule includes switching to the black screen interface after the fourth interface is displayed for predetermined duration. The second screen-off interface includes a fifth interface and a black screen interface, display content of the fifth interface includes the text information and the dynamic picture, and the second always-on display rule includes switching to the black screen interface after the fifth interface is displayed for predetermined duration. After receiving the always-on display instruction, the second processor controls the screen to display the text information and play the dynamic picture within predetermined duration, as shown in 10-*a* to 10-*c* in FIG. 10, and controls the screen to go black after predetermined duration expires, as shown in 10-*d* in FIG. 10. After receiving the screen-off interface switching event, the second processor controls the screen to display the text information and play the dynamic picture within predetermined duration, as shown in 10-*c* to 10-*g* in FIG. 10, and controls the screen to go black after predetermined duration expires, as shown in 10-*h* in FIG. 10. Alternatively, the display content of the fifth interface may include either the text information or the dynamic picture.

Figure 11:
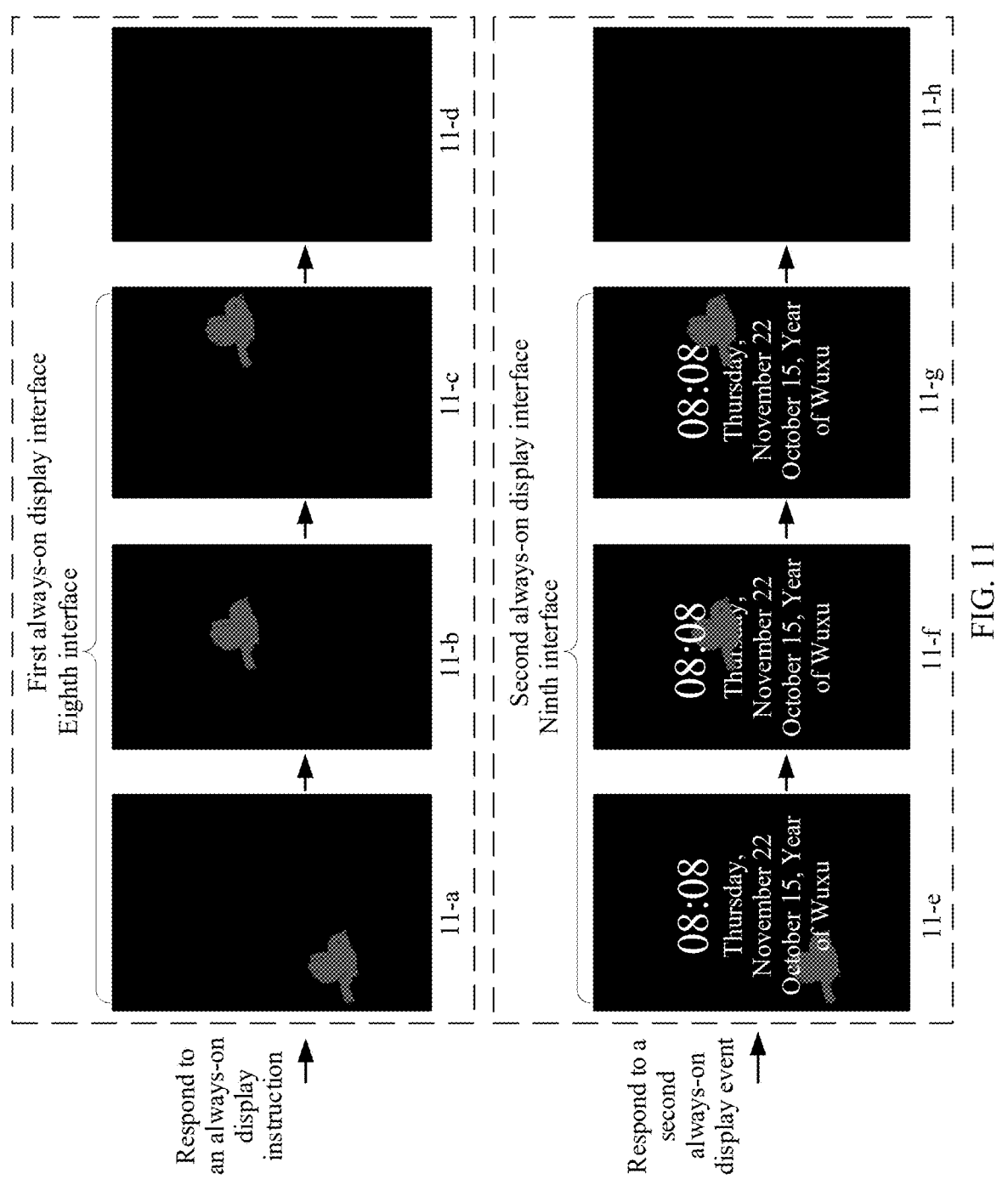
FIG. 11 is a schematic diagram of a seventh application scenario of an always-on display method according to an embodiment of this disclosure.

FIG. 11 is a schematic diagram of a seventh application scenario of an always-on display method according to an embodiment of this disclosure. As shown in FIG. 11, the first screen-off interface includes an eighth interface and a black screen interface, display content of the eighth interface includes the dynamic picture, and the first always-on display rule includes switching to the black screen interface after the eighth interface is displayed for predetermined duration. The second screen-off interface includes a ninth interface and a tenth interface, display content of the ninth interface includes the text information and the dynamic picture, display content of the tenth interface includes a black screen interface, and the second always-on display rule includes switching to the tenth interface after the ninth screen is displayed for predetermined duration. After receiving the always-on display instruction, the second processor controls the screen to play the dynamic picture within predetermined duration, as shown in 11-*a* to 11-*c* in FIG. 11, and controls the screen to go black after predetermined duration expires, as shown in 11-*d* in FIG. 11. After receiving the screen-off interface switching event, the second processor controls the screen to display the text information and play the dynamic picture within predetermined duration, as shown in 11-*e* to 11-*g* in FIG. 11, and controls the screen to go black after predetermined duration expires, as shown in 11-*h* in FIG. 11. Alternatively, the display content of the tenth interface includes the text information. Alternatively, the display content of the ninth interface includes only the text information, and the display content of the tenth interface includes the black screen interface.

The foregoing embodiment describes only some embodiments in the Table. It may be understood that the always-on display method in embodiments of this disclosure may further have another application scenario. As shown in the Table, in the fourth application scenario, after the screen-off interface switching event is received, the second processor controls the screen to display the text information and play the dynamic picture within predetermined duration. After predetermined duration expires, in addition to controlling the display screen to go black, the second processor may alternatively control the display screen to display only the text information. For another example, in the sixth application scenario, after the screen-off interface switching event is received, the second processor controls the screen to display text the information and play the dynamic picture within predetermined duration. After predetermined duration expires, in addition to controlling the display screen to go black, the second processor may alternatively control the display screen to display only the text information.

FIG. 12 is a specific flowchart of step S403 of the always-on display method in FIG. 4. The always-on display control information may further include address information, and the address information indicates a location of a memory for storing each frame of the dynamic picture. As shown in FIG. 12, that the second processor switches the screen-on interface to the first screen-off interface or switches the first screen-off interface to the second screen-off interface in step S403 includes the following steps:

Step S31: The second processor obtains each frame of the dynamic picture from the memory based on the address information.

Step S32: The second processor obtains text information of a text display control.

Step S33: The second processor combines each frame of the dynamic picture with the text information for display.

The second processor directly obtains the text information of the text display control of a preset type, where a type of the text display control displayed on the display screen may be preset by the second processor. Alternatively, the second processor obtains the text information of the text display control of a corresponding type based on identification information, where the always-on display control information includes the identification information and the identification information identifies a type of the text display control. The identification information that identifies the type of the text display control may be carried in the always-on display control information sent by the first processor, so that the second processor controls, based on the identification information, the screen to display the text information of the corresponding text display control. When receiving the screen-off event, the first processor may decompose a screen-off style previously selected by a user, where the screen-off style may include the dynamic picture and the text display control. Further, the first processor may store each frame of the dynamic picture that occupies large space into a memory, and send address information that indicates a location of the memory to the second processor. In this way, during the always-on display period, the second processor may obtain each frame of the dynamic picture based on the address information, and then combine each frame of the dynamic picture with text information of a text display control for display, to form a first screen-off interface or a second screen-off interface, so as to reduce a requirement on performance of the second processor, and help further reduce power consumption of the second processor when the second processor works. In addition, the memory may be applied for by the first processor when receiving the screen-off event. After the always-on display ends, after the first processor is woken up, the memory may be released to be used for another purpose. In addition, it may be understood that the second processor may preset a part of text display controls displayed on the screen, for example, a time point control and a date control, and then identify another part of text display controls, for example, a Chinese calendar, by using identification information based on different screen-off styles.

FIG. 13 is a flowchart of another always-on display method according to an embodiment of this disclosure. The always-on display method is executed by a first processor, and the first processor and a second processor are located in a same terminal device. As shown in FIG. 13, the always-on display method includes the following steps:

Step S1301: In response to a screen-off event, send always-on display control information to the second processor, where the always-on display control information includes an always-on display instruction, and the always-on display instruction indicates the second processor to control a screen during a screen-off period.

Step S1302: Enter a sleep mode after sending the always-on display control information to the second processor.

Figure 14:
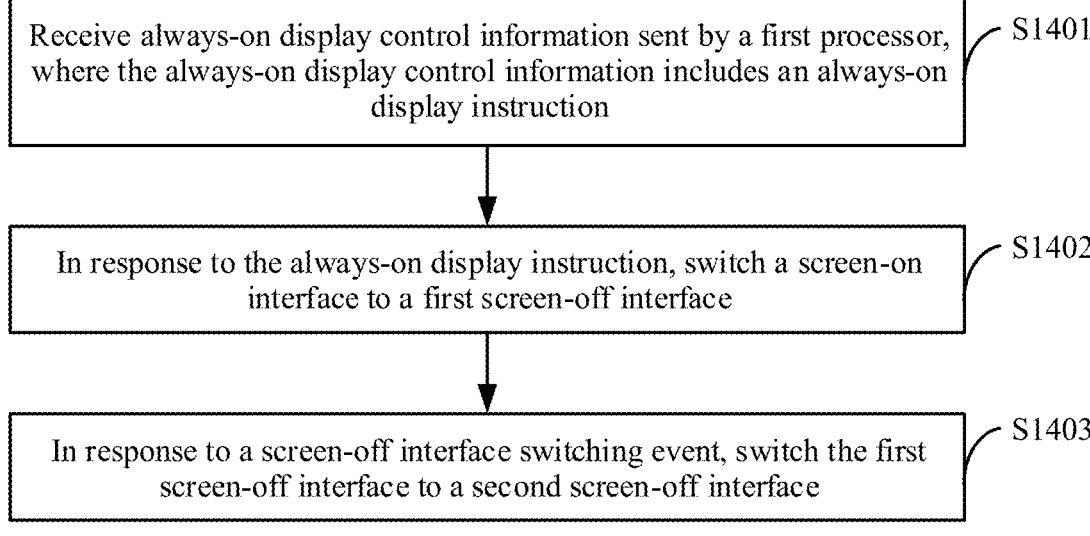
FIG. 14 is a flowchart of still another always-on display method according to an embodiment of this disclosure.

FIG. 14 is a flowchart of still another always-on display method according to an embodiment of this disclosure. The always-on display method is executed by a second processor, and the second processor and a first processor are located in a same terminal device. As shown in FIG. 14, the always-on display method includes the following steps:

Step S1401: Receive always-on display control information sent by the first processor, where the always-on display control information includes an always-on display instruction.

Step S1402: In response to the always-on display instruction, switch a screen-on interface to a first screen-off interface.

Step S1403: In response to a screen-off interface switching event, switch the first screen-off interface to a second screen-off interface.

Display content of at least one of the first screen-off interface and the second screen-off interface includes a dynamic picture.

Figure 15:
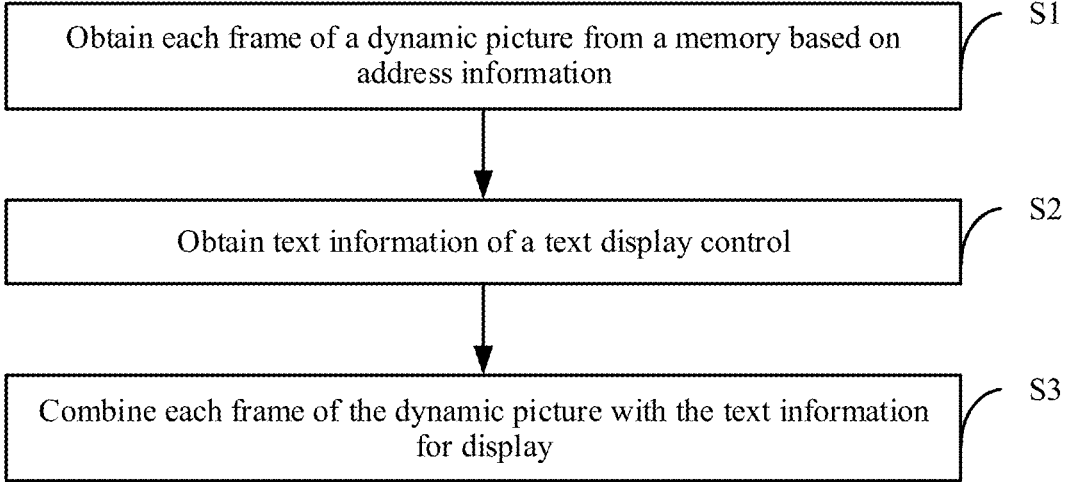
FIG. 15 is a specific flowchart of step S1402 or step S1403 in FIG. 14.

FIG. 15 is a specific flowchart of step S1402 or step S1403 in FIG. 14. Further, the always-on display control information further includes address information, and the address information indicates a location of a memory for storing each frame of the dynamic picture. As shown in FIG. 15, step S1402 or step S1403 further includes the following substeps.

Substep S1: Obtain each frame of the dynamic picture from the memory based on the address information.

Substep S2: Obtain text information of a text display control.

Substep S3: Combine each frame of the dynamic picture with the text information for display.

Figure 16:
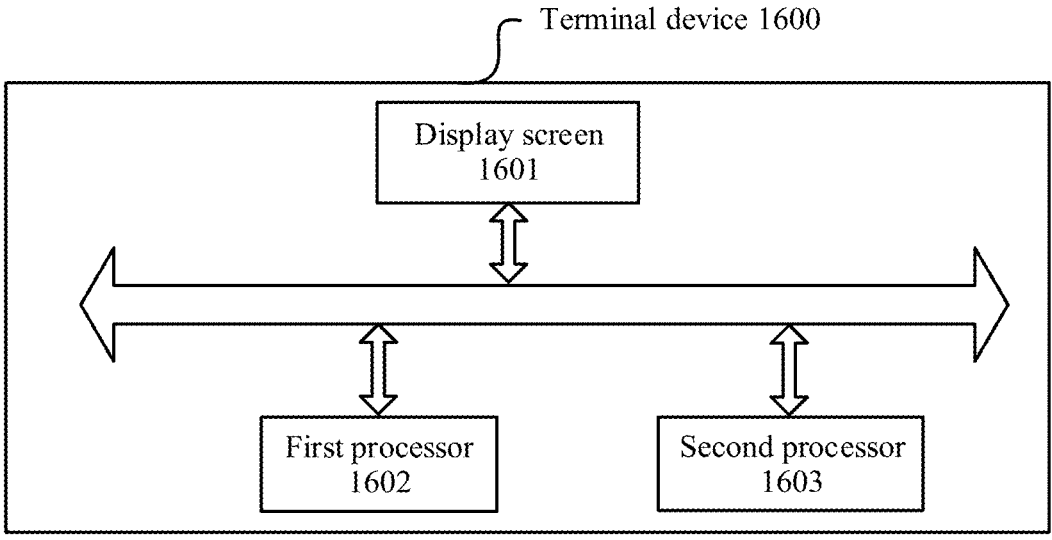
FIG. 16 is a schematic diagram of a structure of a terminal device according to an embodiment of this disclosure.

FIG. 16 is a schematic diagram of a structure of a terminal device according to an embodiment of this disclosure. As shown in FIG. 16, the terminal device 1600 includes a display screen 1601, a first processor 1602, and a second processor 1603. The first processor 1602 and the second processor 1603 may be separately deployed on different chips. The first processor 1602 is configured to, in response to a screen-off event, send always-on display control information to the second processor 1603, where the always-on display control information includes an always-on display instruction, a first always-on display rule, and a second always-on display rule. The first processor 1602 enters a sleep mode after sending the always-on display control information to the second processor 1603. The second processor 1603 is configured to, in response to the always-on display instruction, switch a screen-on interface to a first screen-off interface, where the first screen-off interface is determined by the second processor 1603 according to the first always-on display rule. The second processor 1603 is further configured to, in response to the screen-off interface switching event, switch the first screen-off interface to a second screen-off interface, where the second screen-off interface is determined by the second processor 1603 according to the second always-on display rule. Display content of at least one of the first screen-off interface and the second screen-off interface includes a dynamic picture. The screen-off event is an event that triggers always-on display, and includes that no user operation is received within predetermined duration or a power button is pressed when the screen-on interface is displayed. The screen-off interface switching event is one of a screen touching event, a terminal device moving event, and a screen gazing event. Further, the first processor 1602 is further configured to, in response to a screen-on event, control the display screen 1601 to display a screen-on interface, where the screen-on interface is an interface obtained after the display screen 1601 exits always-on display and the entire screen is woken up, and the screen-on event includes tapping a power button or a fingerprint button when the screen-off interface is displayed.

In addition, the display content of the at least one of the first screen-off interface and the second screen-off interface further includes text information that is of a text display control and that changes with time. A type of the text display control includes at least one of a time point control, a date control, a battery level control, and a Chinese calendar control. In addition, text information of each type of the text display control occupies one or more than two layers. Alternatively, one or more than two types of text display controls are displayed on each layer. In addition, the always-on display control information further includes a stacking order. The stacking order indicates an arrangement order of each frame of the dynamic picture and the text information. The stacking order includes locating at least one frame of the dynamic picture below the text information at a first moment and/or locating at least one frame of the dynamic picture above the text information at a second moment. Further, each frame of the dynamic picture includes M layers, where M is greater than or equal to 2. The stacking order further includes that the text information is located between adjacent layers of the M layers at a third moment.

It should be noted that an application scenario of the terminal device in this embodiment of this disclosure is the same as the application scenario of the foregoing always-on display method. For the application scenario of the terminal device in this embodiment of this disclosure, refer to the application scenario of the foregoing always-on display method.

In addition, the always-on display control information may further include address information. The address information indicates a location of a memory for storing each frame of the dynamic picture. The second processor 1603 is further configured to obtain each frame of the dynamic picture from the memory based on the address information, obtain the text information of the text display control, and combine each frame of the dynamic picture with the text information for display, to form the first screen-off interface or the second screen-off interface.

Further, the second processor 1603 is further configured to directly obtain the text information of the text display control of a preset type, where a type of the text display control displayed on the display screen 1601 is preset by the second processor 1603. Alternatively, the second processor 1603 is further configured to obtain the text information of the text display control of a corresponding type based on identification information, where the always-on display control information includes identification information and the identification information identifies the type of the text display control.

Figure 17:
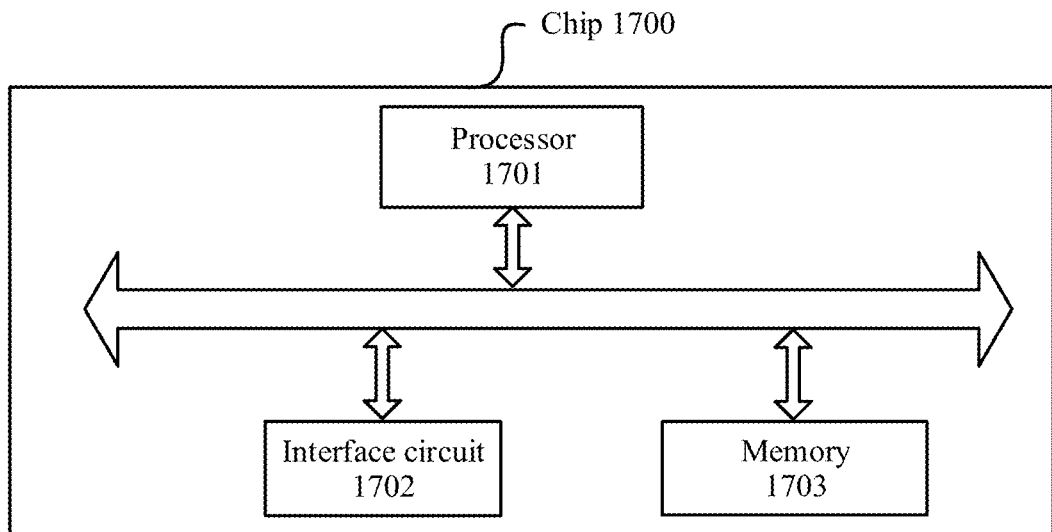
FIG. 17 is a schematic diagram of a structure of a chip according to an embodiment of this disclosure.

FIG. 17 is a schematic diagram of a structure of a chip according to an embodiment of this disclosure. The chip may be applied to a terminal device. As shown in FIG. 17, the chip 1700 includes a processor 1701 and an interface circuit 1702. The processor 1701 is connected to the interface circuit 1702, and the interface circuit 1702 is used by the processor to communicate with another processor. The processor 1701 is configured to perform operations performed by the first processor or the second processor in the foregoing method embodiments.

Further, the chip 1700 may further include a memory 1703. The memory 1703 stores instructions, and the instructions may be executed by the processor 1701. When the instructions are executed by the processor 1701, the chip 1700 may perform operations performed by the first processor or the second processor in the foregoing method embodiments.

In conclusion, the always-on display method and the terminal device are provided in embodiments of this disclosure. During the always-on display period, the first processor does not need to be periodically woken up, and the second processor can control the display screen to play the dynamic picture, so that a user experience effect is improved, a user requirement can be better met, and power consumption of the first processor is significantly reduced.

It may be understood that, the processor in embodiments of this disclosure may be a CPU, and alternatively, the processor may be another general-purpose processor, a digital signal processor (DSP), an application-specific integrated circuit (ASIC), a field-programmable gate array (FPGA) or another programmable logic device, a transistor logic device, a hardware component, or any combination thereof. The general purpose processor may be a microprocessor or any conventional processor or the like.

The method steps in the embodiments of this disclosure may be implemented in a hardware manner, or may be implemented in a manner of executing software instructions by the processor. The software instructions may include corresponding software modules. The software modules may be stored in a random-access memory (RAM), a flash memory, a read-only memory (ROM), a programmable ROM (PROM), an erasable PROM (EPROM), an electrically EPROM (EEPROM), a register, a hard disk, a removable hard disk, a compact-disc (CD) ROM (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedure or functions according to embodiments of this disclosure are all or partially generated. The computer may be a general-purpose computer, a dedicated computer, a computer network, or another programmable apparatus. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, a solid state drive (SSD)), or the like.

It may be understood that various numbers in embodiments of this disclosure are merely used for differentiation for ease of description, and are not used to limit the scope of embodiments of this disclosure.

What is claimed is:

1. An always-on display method implemented by a terminal device, wherein the always-on display method comprises:

responding to a screen-off event by:

sending, by a first processor of the terminal device, always-on display control information to a second processor of the terminal device, wherein the always-on display control information comprises an always-on display instruction; and entering, by the first processor, a sleep mode after sending the always-on display control information to the second processor; and controlling, by the second processor in response to the always-on display instruction, a screen-off interface of a display screen of the terminal device by:

switching, by the second processor, a screen-on interface to a first screen-off interface;

switching, by the second processor in response to a screen-off interface switching event, the first screen-off interface to a second screen-off interface, wherein first display content of at least one of the first screen-off interface and the second screen-off interface comprises a multi-frame animated picture;

determining, by the second processor according to a first always-on display rule, the first screen-off interface; and determining, by the second processor according to a second always-on display rule, the second screen-off interface, wherein the first screen-off interface is a black screen interface, wherein the first always-on display rule comprises controlling the display screen to keep black continuously, wherein the second screen-off interface comprises a first interface and the black screen interface, wherein second display content of the first interface comprises the multi-frame animated picture, and wherein the second always-on display rule comprises switching to the black screen interface after the first interface is displayed for a predetermined duration.

2. The always-on display method of claim 1, wherein the first always-on display rule and the second always-on display rule are in the always-on display control information.

3. The always-on display method of claim 1, wherein the first always-on display rule and the second always-on display rule are preset in the second processor.

4. The always-on display method of claim 1, wherein the first display content further comprises text information comprising a text display control that changes with time.

5. The always-on display method of claim 4, wherein the first screen-off interface comprises the text information, wherein the first always-on display rule comprises continuously displaying the text information, wherein the second screen-off interface comprises a first interface and a second interface, wherein second display content of the first interface comprises the text information and the multi-frame animated picture, wherein third display content of the second interface comprises the text information, and wherein the second always-on display rule comprises switching to display the second interface after the first interface is displayed for a predetermined duration.

6. The always-on display method of claim 4, wherein the first screen-off interface comprises a first interface and a black screen interface, wherein the first interface comprises the text information, wherein the first always-on display rule comprises switching to the black screen interface after the first interface is displayed for a predetermined duration, wherein the second screen-off interface comprises a second interface and the black screen interface, wherein second display content of the second interface comprises the text information and the multi-frame animated picture or the multi-frame animated picture alone, and wherein the second always-on display rule comprises switching to the black screen interface after the second interface is displayed for the predetermined duration.

7. The always-on display method of claim 4, wherein:

the first screen-off interface comprises a first interface and a second interface, wherein the first interface comprises the text information and the multi-frame animated picture, wherein second display content of the second interface comprises the text information, wherein the first always-on display rule comprises switching to display the second interface after the first interface is displayed for a predetermined duration, wherein the second screen-off interface comprises a third interface and a fourth interface, wherein the third interface comprises the text information and the multi-frame animated picture, wherein third display content of the fourth interface comprises the text information, and wherein the second always-on display rule comprises switching to display the fourth interface after the third interface is displayed for the predetermined duration; or the first screen-off interface comprises the first interface and a black screen interface, wherein the first interface comprises the text information and the multi-frame animated picture, wherein the first always-on display rule comprises switching to the black screen interface after the first interface is displayed for the predetermined duration, wherein the second screen-off interface comprises the second interface and the black screen interface, wherein the second display content comprises the text information or the multi-frame animated picture, and wherein the second always-on display rule comprises switching to the black screen interface after the second interface is displayed for the predetermined duration.

8. The always-on display method of claim 4, wherein the first screen-off interface comprises a first interface and a black screen interface, wherein second display content of the first interface comprises the multi-frame animated picture, wherein the first always-on display rule comprises switching to the black screen interface after the first interface is displayed for a predetermined duration, wherein the second screen-off interface comprises a second interface and a third interface, wherein third display content of the second interface comprises the text information or the text information and the multi-frame animated picture, wherein fourth display content of the third interface comprises either the black screen interface or the text information, and wherein the second always-on display rule comprises switching to the third interface after the second interface is displayed for the predetermined duration.

9. The always-on display method of claim 4, wherein a type of the text display control comprises at least one of a time point control, a date control, a battery level control, or a Chinese calendar control, wherein text information of each type of text display control occupies one or more than two layers, or wherein one or more than two types of text display controls are displayed on each layer.

10. The always-on display method of claim 4, wherein the always-on display control information further comprises address information indicating a location of a memory for storing each frame of the multi-frame animated picture, and wherein the always-on display method further comprises:

obtaining, by the second processor, based on the address information, and from the memory, each frame;

obtaining, by the second processor, the text information; and combining, by the second processor, each frame with the text information for display.

11. The always-on display method of claim 10, wherein obtaining the text information comprises:

directly obtaining, by the second processor, the text information of a preset type, wherein a type of the text display control displayed on the display screen is preset by the second processor; or obtaining, by the second processor, based on identification information identifying a type of the text display control, the text information of a corresponding type, wherein the always-on display control information comprises the identification information.

12. The always-on display method of claim 4, wherein the always-on display control information further comprises a stacking order indicating an arrangement order of each frame of the multi-frame animated picture and the text information, and wherein the stacking order comprises locating at least one frame of the multi-frame animated picture below the text information at a first moment or locating at least one frame of the multi-frame animated picture above the text information at a second moment.

13. The always-on display method of claim 12, wherein each frame comprises M layers, wherein M is greater than or equal to 2, and wherein the stacking order further comprises that the text information is located between adjacent layers of the M layers at a third moment.

14. The always-on display method of claim 1, wherein the first processor is a main processor, and wherein the second processor is a coprocessor.

15. The always-on display method of claim 1, wherein the screen-off event comprises avoiding receiving a user operation within a predetermined duration or pressing a power button when a screen-on interface is displayed, or wherein the screen-off interface switching event comprises one of a screen touching event, a terminal device moving event, or a screen gazing event.

16. A terminal device comprising:

a display screen comprising a screen-off interface and configured to obtain a screen-off event, wherein at least one interface in the screen-off interface comprises a multi-frame animated picture;

a first processor coupled to the display screen and configured to:

in response to the screen-off event, send always-on display control information, wherein the always-on display control information comprises an always-on display instruction; and enter a sleep mode after sending the always-on display control information; and a second processor coupled to the first processor and the display screen and configured to:

receive the always-on display control information; and control, in response to the always-on display instruction, the screen-off interface by:

switching a screen-on interface to a first screen-off interface;

switching, in response to a screen-off interface switching event, the first screen-off interface to a second screen-off interface, wherein first display content of at least one of the first screen-off interface and the second screen-off interface comprises a multi-frame animated picture;

determining, according to a first always-on display rule, the first screen-off interface before switching the screen-on interface to the first screen-off interface; and determining, according to a second always-on display rule, the second screen-off interface before switching the first screen-off interface to the second screen-off interface, wherein each of the first screen-off interface and the second screen-off interface comprises a first interface and a black screen interface, wherein second display content of the first interface comprises the multi-frame animated picture, and wherein both the first always-on display rule and the second always-on display rule comprise switching to the black screen interface after the first interface is displayed for a predetermined duration.

* * * * *